US008032762B2

(12) United States Patent
Shingal et al.

(10) Patent No.: US 8,032,762 B2
(45) Date of Patent: Oct. 4, 2011

(54) PROCESS, CIRCUITS, DEVICES, AND SYSTEMS FOR ENCRYPTION AND DECRYPTION AND OTHER PURPOSES, AND PROCESS MAKING

(75) Inventors: Tonmoy Shingal, Kanpur (IN); Chakravarthy Srinivasan, Bangalore (IN); Shankaranarayana Karantha, Mangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/552,760

(22) Filed: Sep. 2, 2009

(65) Prior Publication Data

US 2009/0323951 A1 Dec. 31, 2009

Related U.S. Application Data

(62) Division of application No. 10/932,506, filed on Sep. 1, 2004, now Pat. No. 7,602,905.

(51) Int. Cl.
*H04L 9/28* (2006.01)
*H04K 1/00* (2006.01)
(52) U.S. Cl. ......................................... 713/189; 380/28
(58) Field of Classification Search .................... None
See application file for complete search history.

(56) References Cited

U.S. PATENT DOCUMENTS

| | | | | |
|---|---|---|---|---|
| 6,205,543 | B1 * | 3/2001 | Tremblay et al. | 712/228 |
| 6,549,622 | B1 * | 4/2003 | Matthews, Jr. | 380/29 |
| 7,010,674 | B2 * | 3/2006 | Tremblay et al. | 712/228 |
| 7,197,751 | B2 * | 3/2007 | Fedotov et al. | 719/323 |
| 7,206,811 | B2 * | 4/2007 | Skurikhin et al. | 709/205 |
| 7,219,127 | B2 * | 5/2007 | Huck et al. | 709/204 |
| 7,287,099 | B1 * | 10/2007 | Powderly et al. | 710/7 |
| 7,467,256 | B2 * | 12/2008 | Jain et al. | 711/108 |
| 7,490,228 | B2 * | 2/2009 | Tremblay et al. | 712/228 |
| 7,602,905 | B2 * | 10/2009 | Shingal et al. | 380/28 |
| 7,616,210 | B2 * | 11/2009 | Nagashima | 345/557 |
| 7,631,150 | B2 * | 12/2009 | Pong | 711/147 |
| 7,698,523 | B2 * | 4/2010 | Pong | 711/163 |
| 2002/0186839 | A1 * | 12/2002 | Parker et al. | 380/37 |
| 2003/0005226 | A1 * | 1/2003 | Hong | 711/119 |
| 2003/0028728 | A1 * | 2/2003 | Ito | 711/118 |
| 2004/0054849 | A1 * | 3/2004 | Deenadhayalan et al. | 711/112 |
| 2006/0184804 | A1 * | 8/2006 | Varma et al. | 713/193 |
| 2010/0115195 | A1 * | 5/2010 | Pong | 711/104 |

* cited by examiner

*Primary Examiner* — Christopher Revak
(74) *Attorney, Agent, or Firm* — Wade J. Brady, III; Frederick J. Telecky, Jr.

(57) ABSTRACT

A wireless communications device (110) has a digital section (800) and a radio frequency section (840). The digital section (800) does setup and execution on a set of data in at least first and second threads concurrently in a series of overlapping iterations by dividing the set of data into at least two different subsets and concurrently reading and writing in both subsets. A state machine (1010, 1100) is shared by the setup and execution iterations. Two or more memory units (930, 940) segregate the set of data, the predetermined size of the set of data in the memories (930, 940) combined comprehending the total number of addresses occupied by the set of data utilized in operation of circuitry (910). Dirty bits (1430) are accessible at addresses corresponding to addresses in the memory. A selector circuit (1412) has a selector output selectively coupled to an address line, and to a data line. The selector circuit (1412) responds to a state on a dirty bit line (db) to couple data bits related to the address bits themselves from the address line (1421) to the selector output (1412). Other circuits and methods of manufacture and operation are also disclosed.

40 Claims, 15 Drawing Sheets

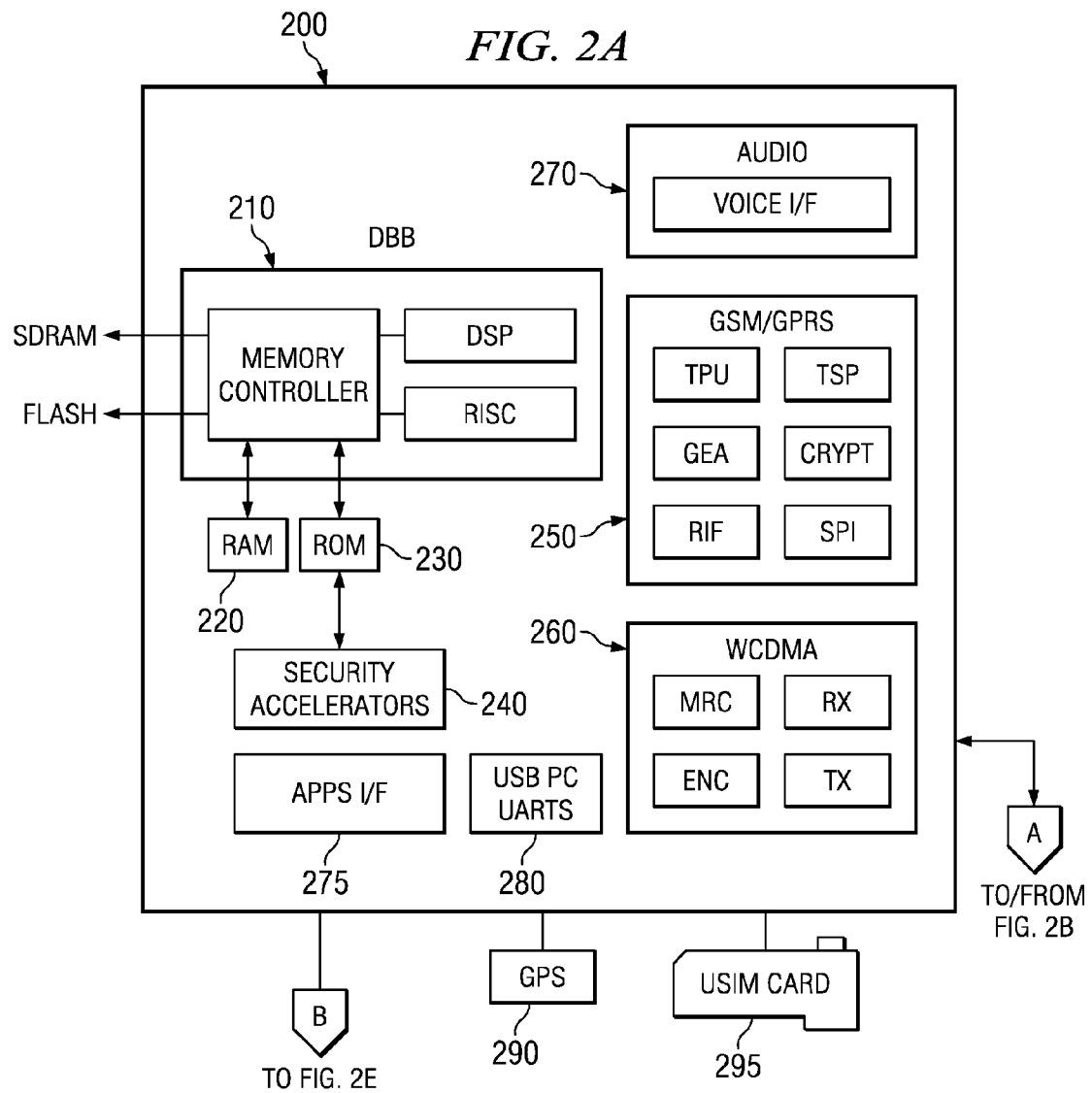

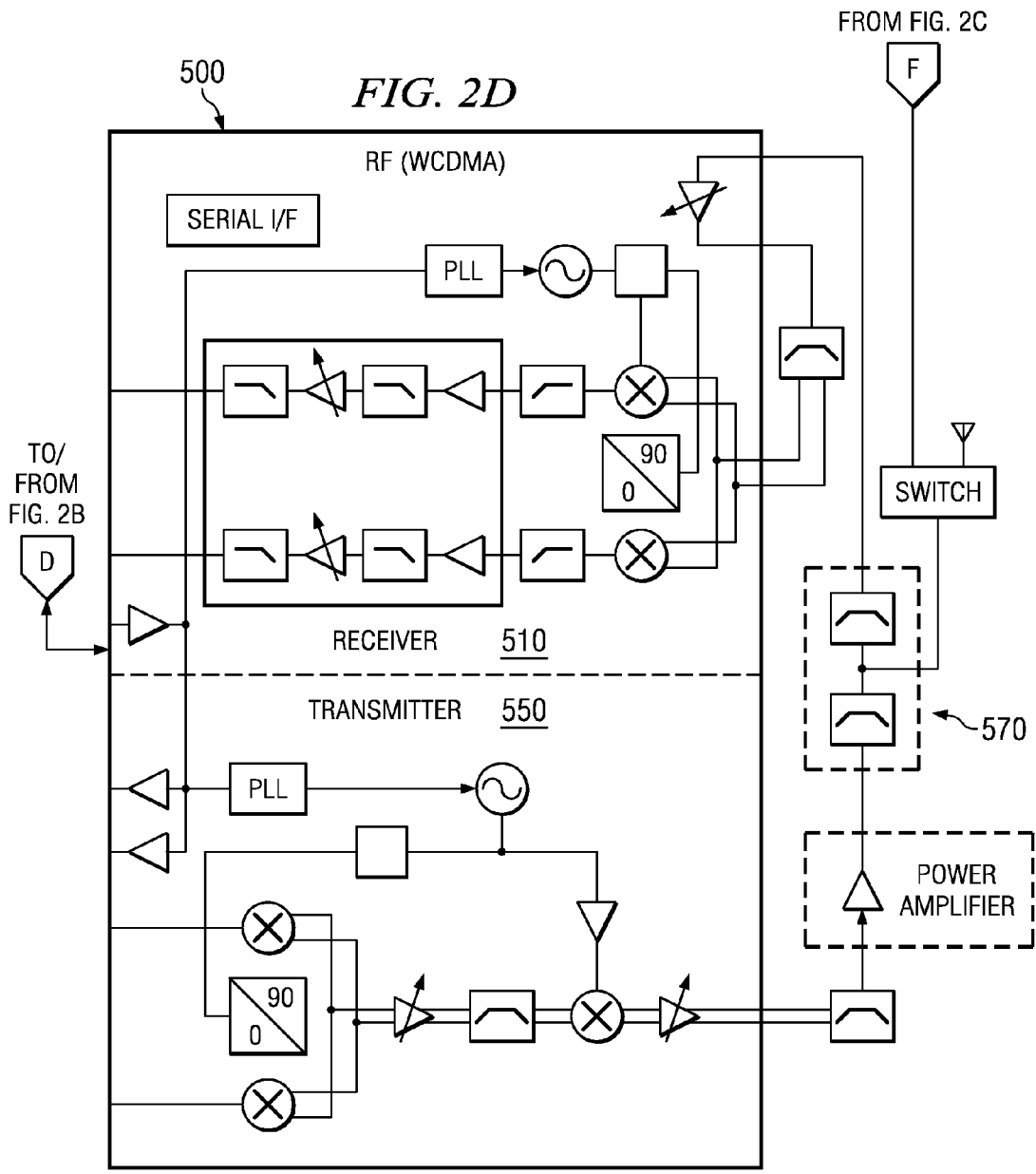

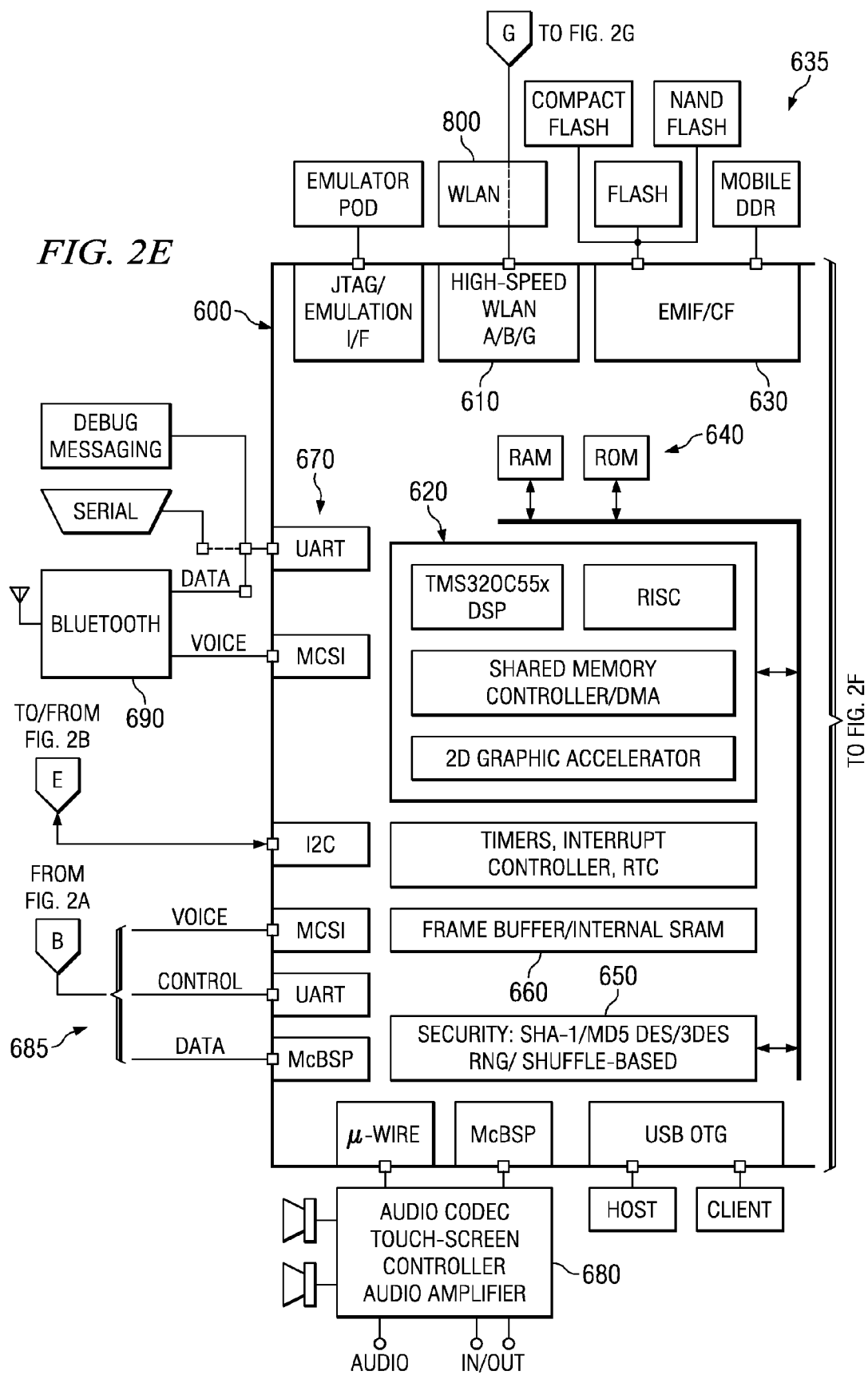

PROCESS, CIRCUITS, DEVICES, AND SYSTEMS FOR ENCRYPTION AND DECRYPTION AND OTHER PURPOSES, AND PROCESS MAKING

CROSS-REFERENCE TO RELATED APPLICATIONS

This application is related to and is a divisional of U.S. patent application Ser. No. 10/932,506, filed Sep. 1, 2004, titled—PROCESSES, CIRCUITS, DEVICES, AND SYSTEMS FOR ENCRYPTION AND DECRYPTION AND OTHER PURPOSES, AND PROCESSES OF MAKING, now issued as U.S. Pat. No. 7,602,905, for which priority under 35 U.S.C. 120 and 35 U.S.C. 121, is hereby claimed to such extent as may be applicable and application Ser. No. 10/932,506 is also hereby incorporated herein by reference.

STATEMENT REGARDING FEDERALLY SPONSORED RESEARCH OR DEVELOPMENT

Not applicable.

BACKGROUND OF THE INVENTION

This invention is in the field of information and communications, and is more specifically directed to improved processes, circuits, devices, and systems for encryption and decryption and other information and communication processing purposes, and processes of making them. Without limitation, the background is further described in connection with wireless communications processing.

Wireless communications, of many types, have gained increasing popularity in recent years. The mobile wireless (or "cellular") telephone has become ubiquitous around the world. Mobile telephony has recently begun to communicate video and digital data, in addition to voice. Wireless modems, for communicating computer data over a wide area network, using mobile wireless telephone channels and techniques are also available.

Wireless data communications in wireless local area networks (WLAN), such as that operating according to the well-known IEEE 802.11 standard, has become especially popular in a wide range of installations, ranging from home networks to commercial establishments. Short-range wireless data communication according to the "Bluetooth" technology permits computer peripherals to communicate with a personal computer or workstation within the same room.

Encryption/decryption techniques are used to improve the security of retail and other business commercial transactions in electronic commerce and the security of communications wherever personal and/or commercial privacy is desirable. Security is important in both wireline and wireless communications.

Digital signal processing (DSP) chips and/or other integrated circuit devices are essential to these systems and applications. Reducing the cost of manufacture and increasing speed of operation without compromising performance is an important goal in DSPs, integrated circuits generally and system-on-a-chip (SOC) design. Cost of manufacture and power consumption usually decrease if the number of electronic logic circuits (gate count) can be reduced. Decreasing the gate count in the encryption/decryption circuit contributes to the goals of reduced cost of manufacture and power consumption. The importance of decreasing the gate count becomes even stronger in hand held/mobile applications where small size is so important, to control the cost and the power consumed.

Speed of operations is reflected in reduced initialization time of encryption and increased throughput of encrypted communications. Both initialization time and throughput are important considerations in communications and other applications. Reduced initialization time reduces delays in starting and continuing communications processes. Increased throughput allows more information to be communicated in the same amount of time, or the same information to be communicated in a shorter time. Communications security should contribute as little overhead, or burden, to communications as possible, all other system requirements being equal.

WEP (Wired Equivalent Privacy) encryption/decryption (RC4) is an example of one data transmission security method. Improved implementations for reduced gate count and increased speed are desirable in the art for data processing generally and for RC4 and other encryption/decryption processes for use at both ends of communications applications such as WLAN and cellular communications.

U.S. Pat. No. 6,549,622, D. P. Matthews, Jr., describes a system and method suggested to be a fast hardware implementation of RC4. U.S. Patent Application Publication 2002/0186839, Parker et al., describes an apparatus and method for cipher processing system using multiple port memory and parallel read/write operations and has a comparator circuit. Further alternative and more advantageous approaches would be desirable in the art.

SUMMARY OF THE INVENTION

Generally and in a form of the invention, an integrated circuit includes execute circuitry operable to execute at least part of an encryption process involving a set of data having numerousness N. The circuitry is arranged to update at least first and second data concurrently in the set in a series of overlapping iterations followed by subsequent overlapping iterations in the series wherein at least one of the second data depends on the uncompleted processing of the first data. An assemblage of memory elements is coupled to the execute circuitry and has at least two read ports and at least two write ports operable for concurrent read and write, the elements having addresses. The number of memory elements is bounded in numerousness by the number N and sufficient to be utilized by the execute circuitry for updating the set of data for a subsequent iteration in the series.

Generally and in another form of the invention, an integrated circuit includes a first memory having a first read port and a first write port for concurrent read and write. The first memory has memory locations for data accessible by asserting respective addresses to the first memory through the first read port and the first write port. The integrated circuit includes a second memory having a second read port and a second write port for concurrent read and write. The second memory has memory locations for data accessible by asserting respective addresses to the second memory through the second read port and the second write port. The integrated circuit further includes address generation circuitry respectively coupled by address lines to the first memory and to the second memory. The address generation circuitry is operable to generate address bits representative of odd and even addresses. The first memory is responsive only to the even addresses, and the second memory is responsive only to the odd addresses.

Generally, an additional form of the invention involves circuitry for use with a storage having storage locations for data and dirty bits accessible at addresses corresponding to addresses in the storage. The circuitry includes an address line for carrying address bits, a data line for carrying data bits, and a dirty bit line for conveying a dirty bit set/reset state. A selector circuit has a selector output selectively coupled to the address line and to the data line. The selector circuit is responsive to a state on the dirty bit line to couple data bits related to the address bits themselves from the address line to the selector output.

Generally, a further process form of the invention resolves a dependency in an integrated circuit including a memory having memory locations for data accessible by asserting respective addresses to the memory. The process includes reading to a first register a first datum stored at a location in the memory represented by a first address. A second address is generated at which the first datum will be stored in the memory. A third address is provided at which a second datum can be read. The second address is compared with the third address, and if different then the second datum is read to a second register from the third address in the memory, and if same then the first datum is copied to the second register as the second datum.

Generally, a yet further process of manufacture form of the invention is for integrated circuits having operations of at least a portion of the integrated circuit definable by Case/Subcase tables. The process includes making at least a first state machine and a second state machine corresponding to a partition of the Case/SubCase tables into at least a first part and a second part.

Generally, an additional form of the invention for operating an integrated circuit includes executing at least part of a process having operations of setup and execution on a set of data in at least first and second threads concurrently in a series of overlapping iterations by sharing a state machine for operations common to the setup and execution iterations.

Generally, an article of manufacture form of the invention includes a substantially planar medium having physically established therein structures corresponding to operations of a process including operations of setup and execution on a set of data in at least first and second threads concurrently in a series of overlapping iterations by dividing the set of data into at least two different subsets and concurrently reading and writing in both subsets.

Other forms of the invention involving processes of manufacture, articles of manufacture, processes and methods of operation, circuits, devices, systems, and wireless communications devices are disclosed and claimed.

BRIEF DESCRIPTION OF THE DRAWINGS

FIGS. 2A-2G are block diagrams of inventive integrated circuit chips for use in the blocks of the communications system of FIG. 1.

FIG. 2A is a block diagram of an integrated circuit including a digital baseband section, the integrated circuit provided on a printed circuit board system of integrated circuit chips for use in a cellular base station and the cellular handsets of FIG. 1.

FIG. 2B is a block diagram of an integrated circuit including an analog baseband section, the integrated circuit provided on a printed circuit board system of integrated circuit chips for use in a cellular base station and the cellular handsets of FIG. 1.

FIG. 2C is a block diagram of an integrated circuit including a GSM/GPRS RF (radio frequency) unit, the integrated circuit on a printed circuit board system of integrated circuit chips for use in a cellular base station and the cellular handsets of FIG. 1.

FIG. 2D is a block diagram of an integrated circuit including a WCDMA (wideband code division multiple access) RF (radio frequency) unit, the integrated circuit on a printed circuit board system of integrated circuit chips for use in a cellular base station and the cellular handsets of FIG. 1.

FIGS. 2E and 2F are two halves of a block diagram of an integrated circuit including application processor circuitry, the integrated circuit provided with off-chip peripherals on a printed circuit board system of integrated circuit chips for use in a cellular base station and the cellular handsets of FIG. 1.

FIG. 2G is a block diagram of a WLAN integrated circuit including MAC (media access controller), PHY (physical layer) and AFE (analog front end), the integrated circuit on a printed circuit board system of integrated circuit chips for use in one, some or all of the cellular base station, the WLAN AP, the WLAN PC, the WLAN gateway, and the two cellular telephone handsets of FIG. 1.

DETAILED DESCRIPTION OF EMBODIMENTS

Figure 1:
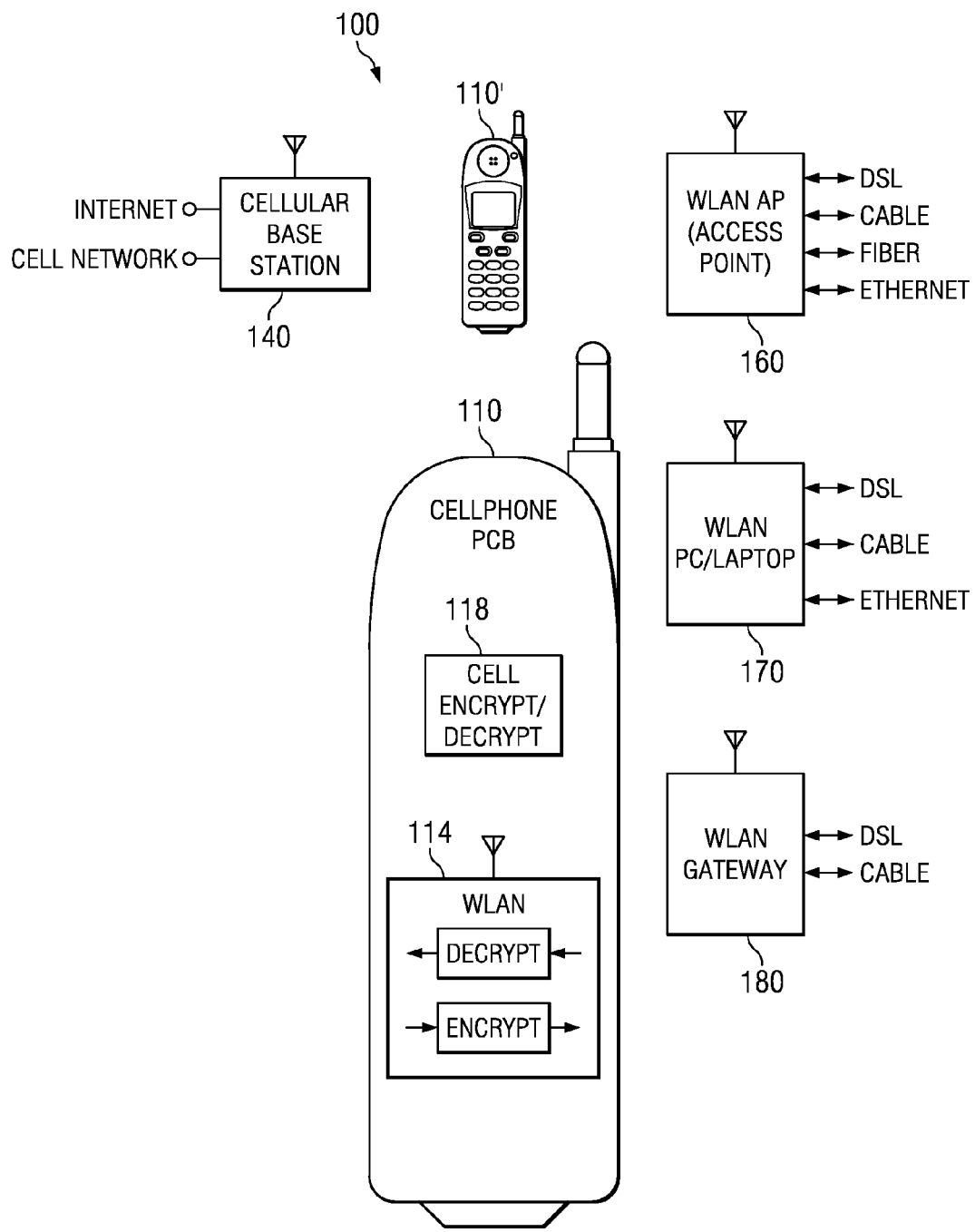
FIG. 1 is a pictorial diagram of a communications system including a cellular base station, a WLAN AP (wireless local area network access point), a WLAN gateway, a WLAN station on a PC/Laptop, and two cellular telephone handsets, any one, some or all of the foregoing improved according to the invention.

In FIG. 1 an improved security-enabled communications system 100 includes two improved cellular telephone handsets 110 and 110'. In handset 110, for example, a WLAN block 114 has improved decryption and encryption. WLAN here refers to IEEE 802.11 compatible networks and other WLAN networks. Also in handset 110, cellular telephone communications are encrypted and decrypted in block 118 suitably also in an improved manner. Handset 110' is correspondingly improved for security. A cellular base station 140 is improved with at least security block similar to block 118 and two-way communicates with the Internet and with cellular telephone networks and PSTN (public switched telephone network). A WLAN AP (wireless local area network access point) 160, personal computer PC/Laptop 170 equipped with WLAN station, and a WLAN gateway 180, are provided with one or more blocks similar to block 114. Any one, some or all of the WLAN AP 160, WLAN station on PC/Laptop 170, and WLAN gateway 180 are provided with one or more PHY physical layer blocks and interfaces as selected by the skilled worker in various products, for DSL (digital subscriber line broadband over twisted pair copper infrastructure), cable (DOCSIS and other forms of coaxial cable broadband communications), fiber (fiber optic cable to subscriber premises), and Ethernet wideband network. In this way advanced networking capability for audio, music, voice, video, e-mail, e-commerce, file transfer and other data services, internet, world wide web browsing, TCP/IP (transmission control protocol/Internet protocol), voice over packet and voice over Internet protocol (VoP/VoIP), and other services are provided with a sufficient level of security for secure utilization and enjoyment appropriate to the just-listed and other particular applications.

FIGS. 2A-2G illustrate inventive integrated circuit chips for use in the blocks of the communications system 100 of FIG. 1. The skilled worker uses and adapts the integrated circuits to the particular parts of the communications system 100 as appropriate to the functions intended. For conciseness of description, the integrated circuits are described with particular reference to use of all of them in the cellular telephone handsets 110 and 110' by way of example. It is contemplated that the skilled worker uses each of the integrated circuits shown, or such selection from the complement of blocks therein provided into appropriate other integrated circuit chips, in a manner optimally combined or partitioned between the chips, to the extent needed by any of the applications supported by the cellular telephone base station 140, WLAN access point 160, PC/Laptop 170 with WLAN, and WLAN gateway 180, as well as personal computers, radios and televisions, fixed and portable entertainment units, routers, pagers, personal digital assistants (PDA), organizers, scanners, faxes, copiers, household appliances, office appliances, combinations thereof, and other application products now known or hereafter devised in which increased security of communication is desirable.

Figure 2B:
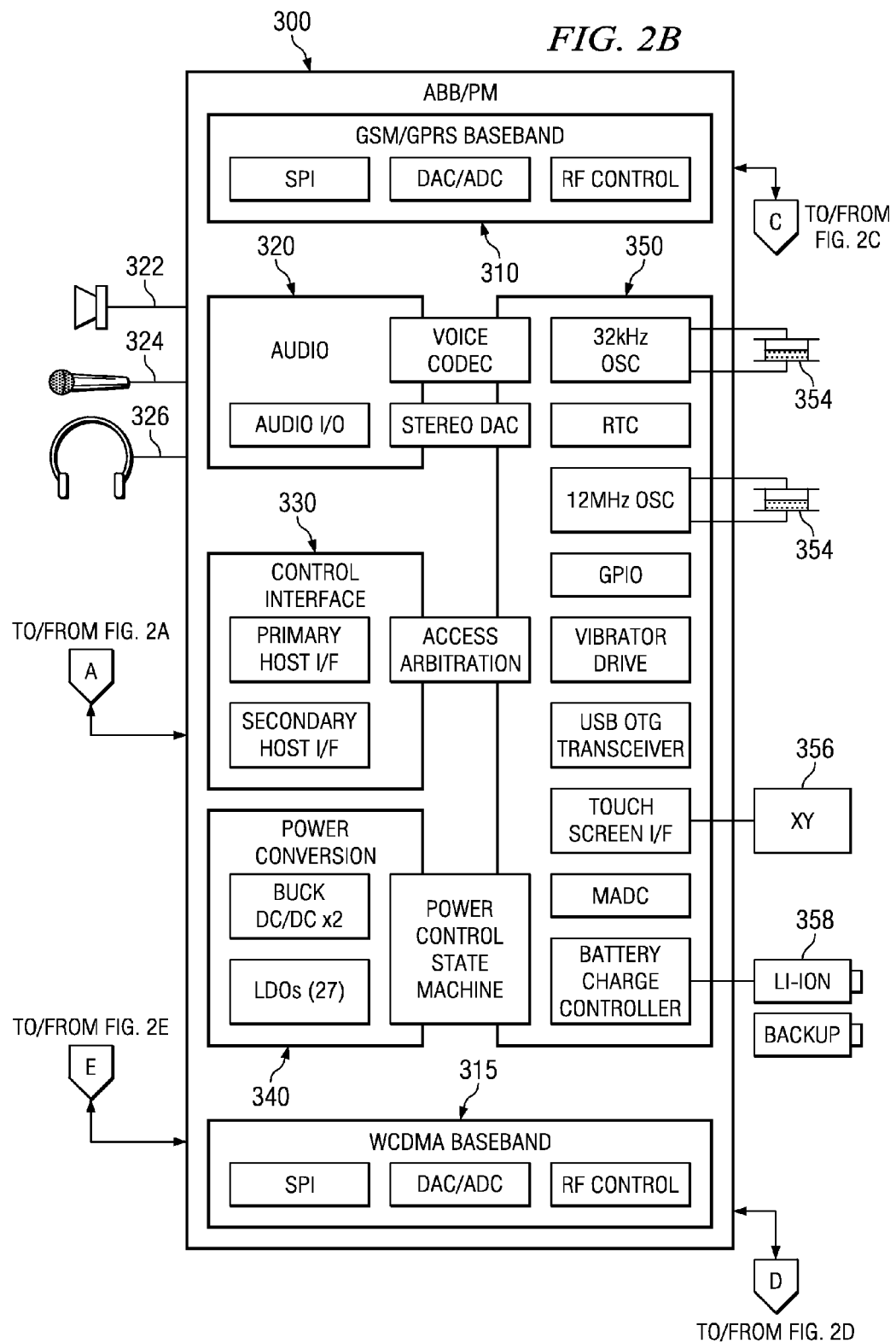

In FIG. 2A, an integrated circuit 200 includes a digital baseband (DBB) block 210 that has a RISC processor (such as MIPS core, ARM processor, or other suitable processor), a digital signal processor (DSP) such as a TMS320C55x DSP from Texas Instruments Incorporated or other digital signal processor, and a memory controller interfacing the RISC and the DSP to Flash memory and SDRAM (synchronous dynamic random access memory). On chip RAM 220 and on-chip ROM 230 also are accessible to the processors via the memory controller. Security accelerators block 240 provide additional computing power accessible, for instance, when the integrated circuit 200 is operated in a security mode enabling the security accelerators block 240. Digital circuitry 250 supports and provides interfaces for one or more of GSM, GPRS, EDGE, and UMTS (Global System for Mobile communications, General Packet Radio Service, Enhanced Data Rates for Global Evolution, Universal Mobile Telecommunications System) wireless, with or without the high speed digital data service, via the analog baseband chip 300 of FIG. 2B and GSM chip 400 of FIG. 2C. Digital circuitry 250 includes ciphering processor CRYPT for GSM A51 and/or A52 ciphering or and/or other encryption/decryption purposes. Blocks TPU (Time Processing Unit real-time sequencer), TSP (Time Serial Port), GEA (GPRS Encryption Algorithm block for ciphering at LLC logical link layer), RIF (Radio Interface), and SPI (Serial Port Interface) are included in digital circuitry 250.

Digital circuitry 260 provides codec for CDMA (Code Division Multiple Access), CDMA2000, and/or WCDMA (wideband CDMA) wireless with or without an HSDPA (High Speed Downlink Packet Access) (or 1xEV-DV, 1xEV-DO or 3xEV-DV) data feature via the analog baseband chip 300 of FIG. 2B and the CDMA chip 500 of FIG. 2D. Digital circuitry 260 includes blocks MRC (maximal ratio combiner for multipath symbol combining), ENC (encryption/decryption), RX (downlink receive channel decoding, de-interleaving, viterbi decoding and turbo decoding) and TX (uplink transmit convolutional encoding, turbo encoding, interleaving and channelizing). Block ENC has blocks for uplink and downlink supporting the F8 confidentiality algorithm and the F9 integrity algorithm of WCDMA or otherwise suitable encryption/decryption process for the communications application.

Audio/voice block 270 supports audio and voice functions and interfacing. Applications interface block 275 couples the digital baseband 210 to the applications processor 600 of FIGS. 2E and 2F. Serial interface 280 interfaces from parallel on-chip digital busses to USB (Universal Serial Bus) of a PC (personal computer). Serial interface 280 includes UARTs (universal asynchronous receiver/transmitter circuit) for performing the conversion of data between parallel and serial lines. Chip 200 is coupled to location-determining circuitry 290 for GPS (Global Positioning System), and to a USIM (UMTS Subscriber Identity Module) 295 or other SIM.

Figure 2C:
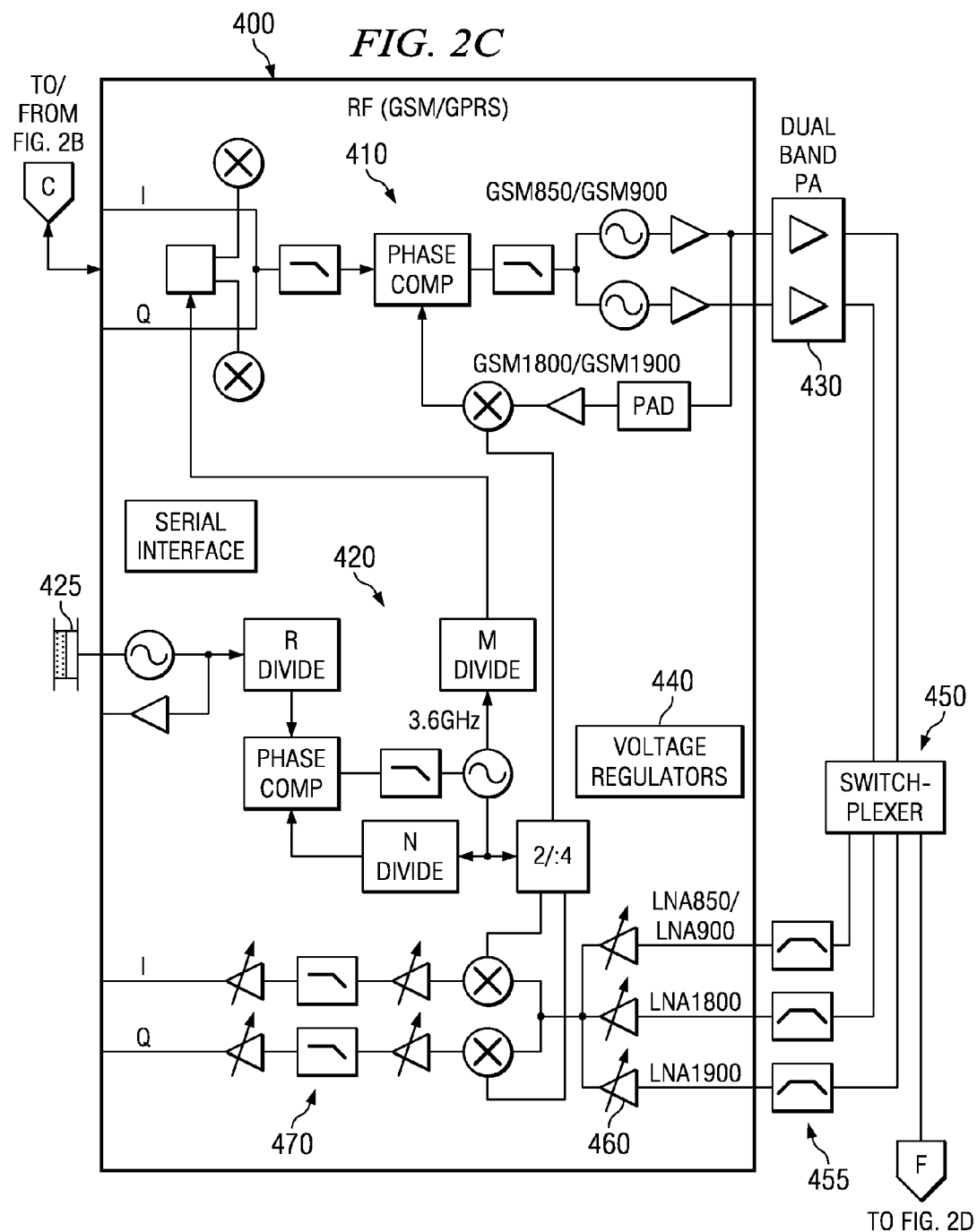

In FIG. 2B a mixed-signal integrated circuit 300 includes an analog baseband (ABB) block 310 for GSM/GPRS/EDGE/UMTS which includes SPI, digital-to-analog/analog-to-digital conversion DAC/ADC block, and RF (radio frequency) Control pertaining to GSM/GPRS/EDGE/UMTS and coupled to RF (GSM etc.) chip 400 of FIG. 2C. Block 315 is an analogous ABB for WCDMA wireless and any associated HSDPA data (or 1xEV-DV, 1xEV-DO or 3xEV-DV data and/or voice) with its respective SPI (Serial Port Interface), digital-to-analog conversion DAC/ADC block, and RF Control pertaining to WCDMA and coupled to RF (WCDMA) chip 500 of FIG. 2D. Audio block 320 has audio I/O (input/output) circuits to a speaker 322, a microphone 324, and headphones 326. Audio block 320 is coupled to a voice codec and a stereo DAC (digital to analog converter), which in turn have the signal path coupled to the baseband blocks 310 and 315 with suitable encryption/decryption activated or not.

Control interface 330 has a primary host interface (I/F) and a secondary host interface to DBB-related integrated circuit 200 of FIG. 2A for the respective GSM and WCDMA paths. The integrated circuit 300 is also interfaced to the I2C port of applications processor chip 600 of FIG. 2E. Control interface 330 is also coupled via access arbitration circuitry to the interfaces in circuits 350 and the basebands 310 and 315. Power conversion block 340 includes buck voltage conversion circuitry for DC-to-DC conversion, and low-dropout (LDO) voltage regulators for power management/sleep mode of respective parts of the chip regulated by the LDOs. Power conversion block 340 provides information to and is responsive to a power control state machine shown between the power conversion block 340 and circuits 350.

Circuits 350 provide oscillator support for the audio circuit 320 including voice codec and stereo DAC. A 32 KHz oscillator and 12 MHz oscillator are included for clocking chip 300. The oscillators have frequencies determined by respective crystals 354. Circuits 350 include a RTC real time clock (time/date functions), general purpose I/O, a vibrator drive (supplement to cell phone ringing features), a USB On-The-Go (OTG) transceiver, and touch screen interface. A touch screen 356 off-chip is connected to the touch screen interface on-chip. Batteries such as a lithium-ion battery 358 and backup battery provide power to the system and battery data on suitably provided separate lines from the battery pack. When needed, the battery also receives charging current from the Battery Charge Controller in analog circuit 350 which includes MADC (Monitoring ADC and analog input multiplexer such as for on-chip charging voltage and current, and battery voltage lines, and off-chip battery voltage, current, temperature) under control of the power control state machine.

In FIG. 2C an RF integrated circuit 400 includes a GSM/GPRS/EDGE/UMTS RF transmitter block 410 supported by oscillator circuitry 420 with off-chip crystal 425. Transmitter block 410 is fed by baseband 310 of FIG. 2B. Transmitter block 410 drives an off-chip dual band RF power amplifier (PA) 430. On-chip voltage regulators 440 maintain appropriate voltage under conditions of varying power usage. Off-chip switchplexer 450 couples wireless antenna and switch circuitry in FIG. 2D to both the transmit portion 410, 430 in FIG. 2C and receive portion next described. Switchplexer 450 is coupled via band-pass filters 455 to receiving LNAs 460 (low noise amplifiers) for 850/900 MHz, 1800 MHz, and 1900 MHz. Depending on the band in use, the output of LNAs 460 couples to GSM/GPRS/EDGE/UMTS demodulator 470 to produce the I/Q outputs thereof (in-phase, quadrature) to the GSM/GPRS/EDGE/UMTS baseband block 310 in FIG. 2B.

In FIG. 2D an integrated circuit 500 supports WCDMA (wideband code division multiple access) RF (radio frequency) in a receiver section 510 and a transmitter section 550. The antenna of the cellular telephone handset 110 couples to a switch unit 570 that in turn couples to the GSM circuits of FIG. 2C and the CDMA circuits of FIG. 2D. The receiver output lines at upper left and transmitter input lines at lower left are all coupled to the WCDMA/HSDPA baseband block 315 in FIG. 2B.

Figure 2F:
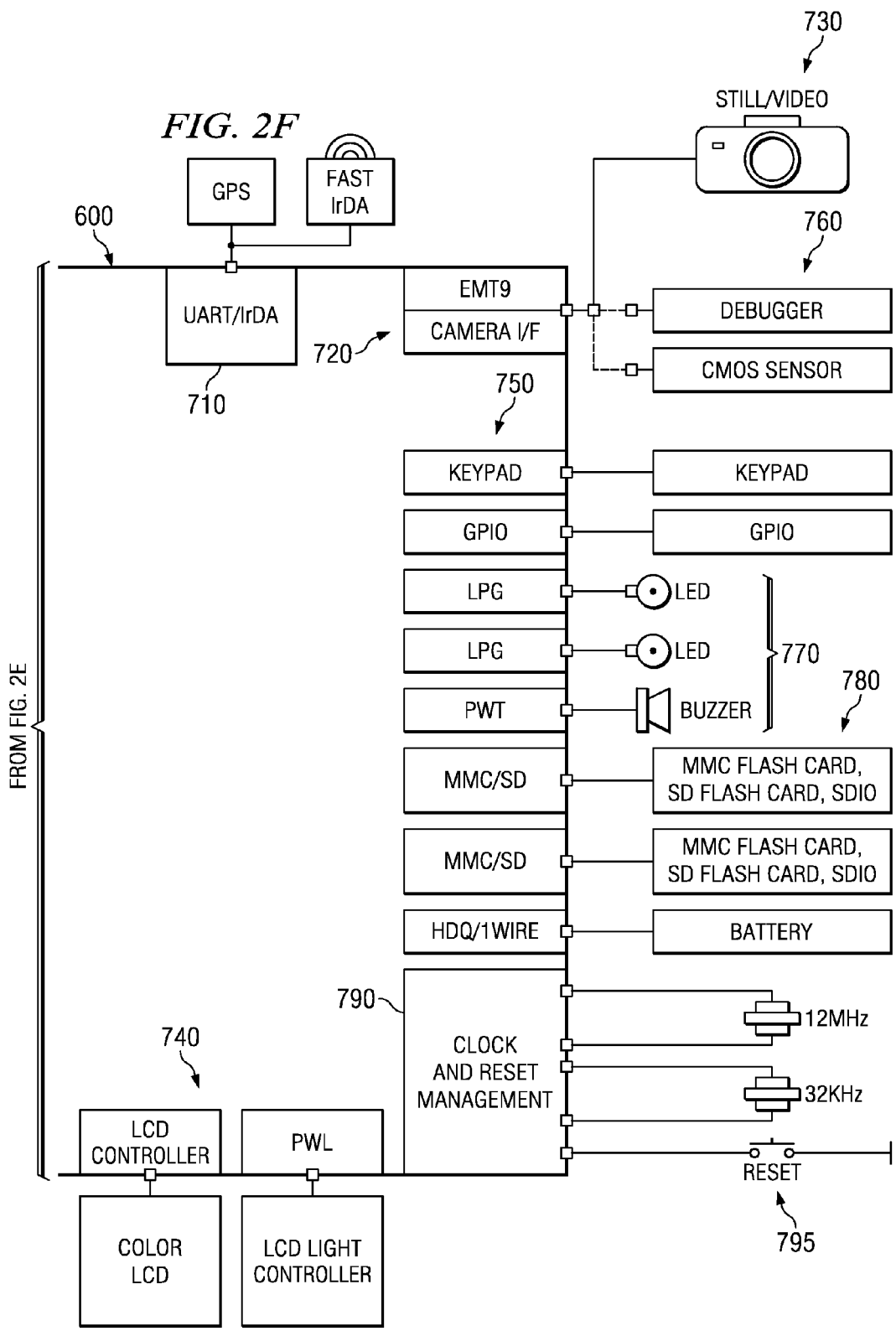

In FIGS. 2E and 2F are illustrated two halves of the block diagram of an integrated circuit chip 600 for application processing and various off-chip peripherals.

Figure 2G:
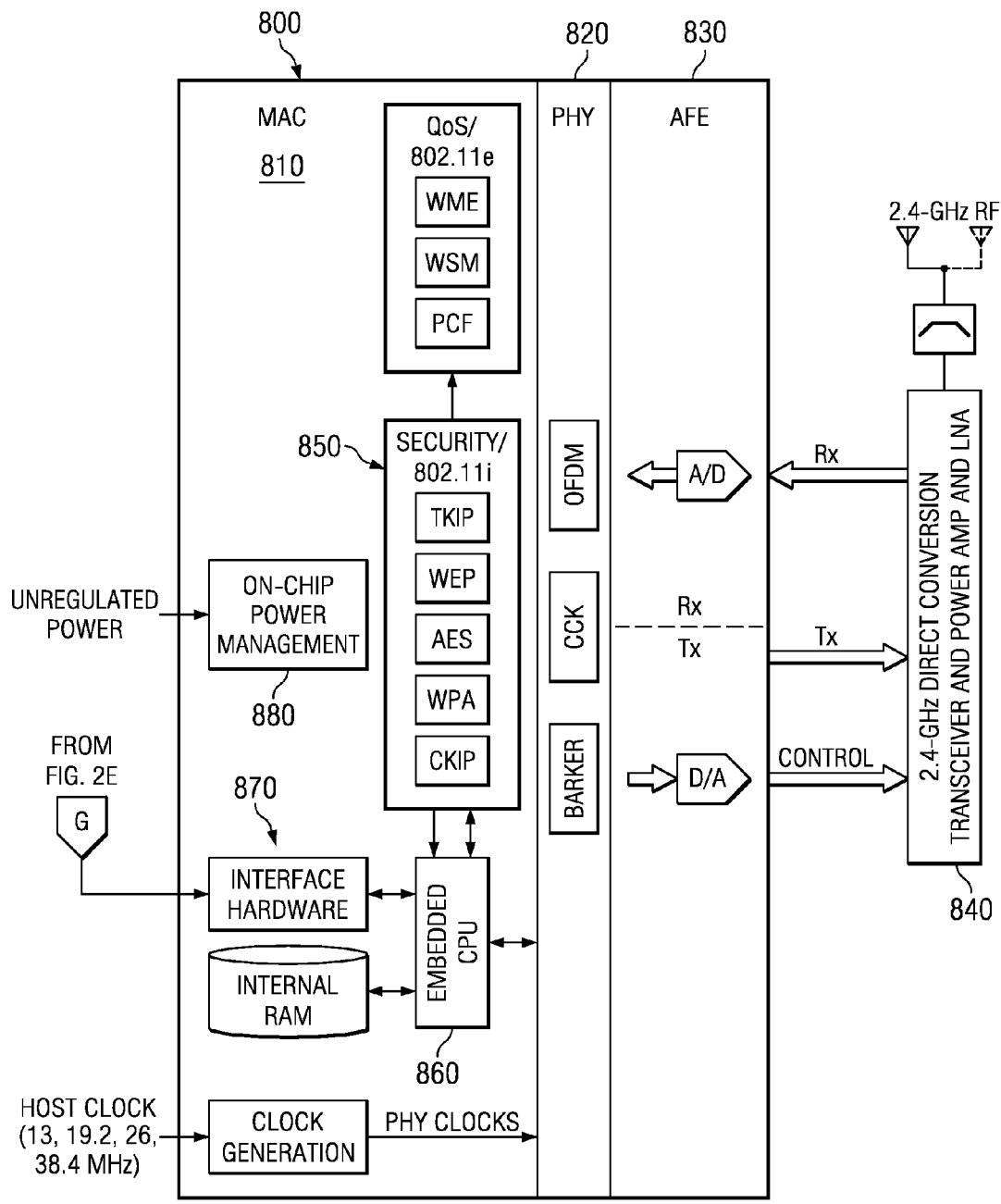

Beginning with FIG. 2E, on-chip are found a high-speed WLAN 802.11a/b/g interface circuit 610 coupled to the WLAN chip 800 of FIG. 2G. As described in connection with FIG. 2G and elsewhere herein, WLAN chip 800 has improved circuitry and processes for encryption and decryption.

Further provided on chip 600 is an applications processing section 620 which includes a RISC processor (such as MIPS core, ARM processor, or other suitable processor), a digital signal processor (DSP) such as a TMS320C55x DSP from Texas Instruments Incorporated or other digital signal processor, and a shared memory controller with DMA (direct memory access), and a 2D (two-dimensional display) graphic accelerator. The RISC and the DSP have access via on-chip extended memory interface (EMIF/CF) 630 to off-chip memory resources 635 including as appropriate, mobile DDR (double data rate) DRAM, and flash memory of any of NAND Flash, NOR Flash, and Compact Flash. On-chip, the shared memory controller in circuitry 620 interfaces the RISC and the DSP via on-chip bus to on-chip memory 640 with RAM and ROM. The 2D graphic accelerator is coupled to frame buffer internal SRAM (static random access memory) 660.

Further in FIG. 2E, security 650 is provided by security features and encryption and decryption of any one or more types known in the art. A random number generator RNG is provided in security 650. Among the Hash approaches are SHA-1 (Secured Hashing Algorithm), MD2 and MD5 (Message Digest version #). Among the symmetric approaches are DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard). Among the asymmetric approaches are RSA, DSA, DH, NTRU, and ECC (elliptic curve cryptography). The security features contemplated include any of the foregoing hardware and processes and/or any other known or yet to be devised security and/or hardware and encryption/decryption processes implemented in hardware or software. Improvements are suitably implemented as described herein. Some of the foregoing encryption/decryption processes are shuffle-based which has to do with encryption key formation and processing also as described in more detailed herein.

Further in FIG. 2E, on-chip peripherals 670 include UART data interface and MCSI (Multi-Channel Serial Interface) voice interface for off-chip Bluetooth short distance wireless circuit 690. Debug messaging and serial interfacing are also available through the UART. A JTAG emulation interface couples to an off-chip emulator pod for test and debug.

Further in peripherals 670 are an I2C interface to analog baseband ABB chip 300 of FIG. 2B, and an interface 685 to applications interface 275 of integrated circuit chip 200 having digital baseband DBB in FIG. 2A. Interface 685 includes a MCSI voice interface, a UART interface for controls, and a multi-channel buffered serial port (McBSP) for data. Timers, interrupt controller, and RTC (real time clock) circuitry are provided in chip 600.

Further in peripherals 670 are a MicroWire (u-wire 4 channel serial port) and multi-channel buffered serial port (McBSP) to off-chip Audio codec, a touch-screen controller, and audio amplifier 680 to stereo speakers. External audio content and touch screen (in/out) are suitably provided. Additionally, an on-chip USB OTG interface couples to off-chip Host and Client devices. These USB communications are suitably directed outside handset 110 such as a PC (personal computer) or inside the handset.

Turning to FIG. 2F illustrating further features of chip 600, various further interfaces and features are shown. Note that the block diagram is to be understood as providing on-chip peripheral bussing and couplings between the application processing circuitry 620 and the various on-chip peripheral blocks, regardless of whether the diagram lacks explicitly-shown busses and couplings, as is understood by the skilled worker.

An on-chip UART/IrDA (infrared data) interface 710 couples to off-chip GPS (global positioning system) and Fast IrDA infrared communications device. Interface 720 provides EMT9 and Camera interfacing to one or more off-chip still cameras or video cameras 730, and/or to a CMOS sensor of radiant energy, and/or to a debugger.

Further in FIG. 2F, an on-chip LCD controller and associated PWL (Pulse-Width Light) block 740 are coupled to a color LCD display and its LCD light controller off-chip. Further, on-chip interfaces 750 are respectively provided for off-chip keypad and GPIO 760, on-chip LPG (LED Pulse Generator) and PWT (Pulse-Width Tone) interfaces are respectively provided for off-chip LED and buzzer peripherals 770. On-chip MMC/SD multimedia and flash interfaces are provided for off-chip MMC Flash card, SD flash card and SDIO peripherals 780. An on-chip selectable-mode HDQ or 1-Wire (hardware protocols) battery monitoring serial interface module is provided for monitoring the off-chip Battery.

On-chip Clock and Reset management circuitry 790 is connected to off-chip 12 MHz and 32 KHz crystals and to a reset pushbutton switch 795.

In FIG. 2G, a WLAN integrated circuit 800 includes MAC (media access controller) 810, PHY (physical layer) 820 and AFE (analog front end) 830. PHY 820 includes blocks for BARKER coding, CCK, and OFDM. PHY 820 receives PHY Clocks from a clock generation block supplied with suitable off-chip host clock, such as at 13, 16.8, 19.2, 26, or 38.4 MHz. These clocks are often found in cell phone systems and the host application is suitably a cell phone or any other end-application.

AFE 830 is coupled by receive (Rx), transmit (Tx) and CONTROL lines to an off-chip WLAN RF circuitry 840. WLAN RF 840 includes a 2.4 GHz (and/or 5 GHz) direct conversion transceiver and power amplifier and has low noise amplifier LNA in the receive path. Bandpass filtering couples WLAN RF 840 to a WLAN antenna.

In MAC 810, Security circuitry 850 supports any one or more of various encryption/decryption processes such as WEP (Wired Equivalent Privacy), RC4, TKIP, CKIP, WPA, AES (advanced encryption standard), 802.11i and others. Note that the RC4 and TKIP and other processes are shuffle based processes. RC4 has been an early encryption/decryption process in WLAN technology. It is expected that that the installed base of WLAN modems will become a mix of earlier and later-provided encryption/decryption processes in the industry and among users. Accordingly, it will be expected for a long time for a WLAN modem to include the early encryption process(es) even as and after such later encryption/decryption processes are introduced.

The security circuitry and processes depicted in FIGS. 3, 4, 5, 6, 9, 10, 11 and 12 are suitably situated in security block 850 of FIG. 2G, security block 650 of FIG. 2E, security accelerators 240, ENC block in 260, and cryptographic area 250 of FIG. 2A, and generally in either or both of encryption/decryption blocks 114 and 118 of FIG. 1 located in any of the handset 110, 110', cellular base station 140, WLAN AP 160, PC/Laptop 170, and WLAN gateway 180 and wherever the advantages of the security circuitry and processes in FIGS. 3, 4, 5, 6, 9, 10, 11 and 12 commend their use.

Further in FIG. 2G, embedded CPU (central processing unit) 860 is connected to internal RAM and coupled to provide QoS (Quality of Service) IEEE 802.11e operations WME, WSM, and PCF (packet control function). Security block 850 in FIGS. 2G and 900 of FIG. 3 has busing for data in, data out, and controls interconnected with CPU 860. Interface hardware 870 and internal RAM on-chip couples CPU 860 with (see FIG. 2E) interface 610 of applications processor integrated circuit 600 of FIG. 2E.

Without limiting the generality of application of the various inventive embodiments, some examples are next described specifically in connection with their advantages in relation to hardware acceleration for the RC4 process in WEP encryption/decryption methods and implementations.

Some embodiments provide a faster throughput implementation, are less gate and memory intensive, and are more gate efficient and more memory efficient in their implementation of WEP (RC4) and other encryption and decryption and information processing methods. Some of these embodiments use fractional-size dual and multiple memory banks and adopt a look-ahead method mechanism for high performance and acceleration. Other embodiments use full size memory with multiple read/write ports. Some of the embodiments have a dirty-bit scheme for substantially reducing the setup time of the process. Still other features and advantages are evident from the description herein.

Many encryption/decryption core algorithms, such as RC4, can utilize a shuffling or swapping algorithm in them. Moreover, each of the core algorithms can be used in various more extensive algorithms, just as RC4 is used in WPA (WEP and TKIP together) for instance.

Where the term "encryption" is used by itself, it should be understood that either or both of encryption and decryption are intended as example applications. The term "encryption" shall include "ciphering" and "enciphering", and the term "decryption" shall include "deciphering" herein. "Storage" refers to memory, registers, media, and any other device, circuit, or element that holds information, and combinations of any of the foregoing forms of storage.

RC4 Algorithm. The first step is to initialize the 256 byte Sbox (S[0] to S[255] each being 8 bits) array and the 256 byte key array (K[0] to K[255] each being 8 bits). Separate key memory is not needed and local memory is suitably used to store the key.

Step 1: Initialization Consists of Two Steps

---

(a) Sbox initialization
Initialize j to 0
for i = 0 to 255
    S[i] = i
(b) Sbox shuffling
for i = 0 to 255
    j = (j + S[i] + K[i]) mod 256 ; (The symbols
"$j_{i=0}$" and "$j_{i=1}$" represent this formula only for purposes of
shuffling section description.)
    Read S[j]
        Swap S[i] and S[j] (i.e. holding byte = S[j], S[j] =
S[i] and S[i] = holding byte. S[k] is a location in the
memory at an address k outside of Sbox which is used for
the holding byte; otherwise a register is used.)

---

Note: K[i] is formed and found from the WEP key array. The key array is made up of repeated iterations of the IV (initialization vector for the key) and the WEP key. WEP key is variable length. Once complete, initialize i and j to 0. The IV is 3 bytes (and for WPA, i.e., WEP and TKIP together, it is 6 bytes). The WEP key is variable length and is stored in local memory.

Step 2: Encryption/Decryption

---

Initialize indices i and j back to '0'.
To encrypt/decrypt a random byte, perform the following:
    i = (i + 1) mod 256
    j = (j + S[i]) mod 256    ;   (The symbols "$j_{i=0}$" and
"$j_{i=1}$" are same symbols as noted in STEP 1 above but note
different meaning here. Each of "$j_{i=0}$" and "$j_{i=1}$" represent
this distinct formula but only for purposes of the
encryption/decryption section description.)
    swap S[i] and S[j]
    t = (S[i] + S[j]) mod 256 ; (The symbols "$t_{i=0}$" and
"$t_{i=1}$" each represent this formula for purposes of the
encryption/decryption section below)
    Key = S[t]
    Data Out = Data In XOR Key

---

Dirty bit Approach: A dirty bit approach eliminates the Sbox initialization step (Step 1(a)) of the initialization phase of the algorithm. Conventionally, in the Sbox initialization step the $i^{th}$ Sbox data byte at address location i of the Sbox array is written with the data value i itself (i.e. S[0]=0, S[1]=1, S[255]=255).

By contrast, in the dirty bit enhanced embodiment described next (and hereinbelow at FIGS. 9 and 11), each Sbox location has associated with it an additional dirty bit which is independently set and reset as described.

Thus, in effect, each Sbox location is simply assigned a dirty bit status instead of undergoing conventional 0 through 255 initialization. The time consuming steps of initializing the Sbox array entries are omitted, and do not occur at all in this embodiment. Initially the dirty bits corresponding to all the Sbox values (S[0] to S[255]) are reset to 'zero'. Advantageously, the dirty bit cells are simultaneously reset upon initialization by one reset signal in one clock cycle.

Then, as operations continue, whenever a Sbox location is written to, its corresponding dirty bit is set. Setting the dirty bit indicates that whatever is the value of Sbox in that particular location is a valid value. That is, the value in that Sbox byte is the actual bit contents in that Sbox byte, which are physically read as needed to determine what those contents are. Whenever any Sbox location is to be read, its corresponding dirty bit status is checked. If the dirty bit is set, then whatever value is in the corresponding byte in the Sbox array is a valid Sbox value and is read as needed to retrieve that valid value.

Otherwise, when the dirty bit status check shows the dirty bit is not set, the read value in this embodiment is understood to be the location number, or byte address, itself (i.e. S[i]=i) of the Sbox location or byte in question. Since that byte address is already asserted to access the dirty bit, that address is conveyed onto data output lines of the Sbox memory or associated circuitry when the dirty bit is indeed not set, thereby to represent the understood read value. Put another way, if the dirty bit is not set, that particular Sbox byte has never been written to, hence that byte is regarded as if it retains the value S[i]=i, regardless of the actual bit contents in that Sbox byte. Implementing this scheme eliminates any requirement of a multi-cycle Sbox initialization step.

The Sbox array can be implemented in hardware, in a memory, or in registers. Memory implementation is a gate efficient way to implement the Sbox space as compared to a register implementation. The tradeoff is large Sbox initialization time (one memory access cycle to initialize one memory location). Advantageously, the dirty bit approach completely eliminates this series of initialization steps in implementation.

Two 2-Port Half-Memories with Double-Byte Throughput

Look ahead mechanism: In a memory-based implementation for each single byte of processing of Sbox every iteration of Sbox setup shuffling step (Step 1(b)) involves two Sbox reads and writes (at locations S[i] and S[j]). Also encryption/decryption of each single byte of data involves three Sbox reads (at S[i], S[j] and S[t]) and two Sbox writes (at S[i] and S[j]). A single dual port memory approach might do a single read and single write from and to the memory through the dedicated read and write ports. Thus, the Sbox shuffling step might take two clock cycles or more per iteration per single byte of yield (for 256 iterations). Encryption/decryption of a byte of data might take three clock cycles or more per iteration per single byte of yield. In both setup and encryption, only a single byte would have been obtained from the iteration even though a dual port memory were used.

In a disclosed embodiment herein having two dual-port half-size memory banks, a look ahead mechanism processes two Sbox setup shuffle iterations at a time and encrypts/decrypts two bytes of data likewise by adopting a look ahead mechanism. The look ahead mechanism remarkably uses just the same total memory space for the Sbox as would have been conventionally needed to process just one byte of data. Where larger memory banks are used, they suitably have their extra space (no longer needed for Sbox) used for other applications and features.

In other words, execute circuitry operates to execute at least part of an encryption process involving a set of data having a predetermined size or numerousness N (e.g., N=256). The circuitry is arranged to update at least first and second data (not just a single byte at a time) concurrently in the set in a series of overlapping uniform or variable length iterations followed by subsequent overlapping iterations in the series. The circuitry processes the data in at least first and second threads concurrently in the set in the series of overlapping uniform or variable-length iterations. In one of the iterations at least one of the second data depends on the uncompleted processing of the first data.

An assemblage of memory elements is coupled to the execute circuitry, and the assemblage of memory elements has one, two, or more read ports and one, two, or more write ports operable for concurrent read and write. The number of memory elements used, even though the number used is bounded in numerousness by the number N, is sufficient to be utilized by the execute circuitry for updating the set of data for a subsequent iteration in the series. The assemblage of memory elements is arranged in some embodiments into at least two memory units segregating the set of data. The predetermined size N comprehends the total number of addresses occupied by the set of data utilized in operation of the execute circuitry in the memory units combined.

Note that the higher byte addresses (e.g., $j_{i=1}$ and $t_{i=1}$) and values (e.g., Sj1, St1) depend on the results of the lower byte calculations (e.g., $j_{=0}$, Sj0 and swapped-in S0). However, even though dependencies exist, the remarkable processing obtains the lower-byte results just in time in the multiple-byte iteration and handles them so that the results obtained for higher-byte processing are the correct ones because the dependencies are resolved just in time beforehand. The lower address operations actually affect two locations of the Sbox space-specifically the j (i+0) and the i+0 location of the lower address byte (in the two byte case). When computing the next byte (i+1) of operation, if the access to the memories that are required are not the ones being modified by the lower address operation (i.e., j(i+0) and i+0)), then the fetched result from the memory can be used as such. However, if the access required to the memory for the higher address is to a location modified by the lower address operation, then instead of using the fetched result from the memory, the hardware and method advantageously use the modified value directly. This is accomplished by one or more multiplexers that selects which value of the Sbox is to be selected in response to the select signal and the dirty bit. This extra logic is accommodated within one cycle of operation and contributes to the dramatically improved performance.

Put another way, a method of processing of two or more bytes of data here can have the steps respective to the two or more bytes overlap in time whereby overall execution time is dramatically reduced. Below is further description how to go about it.

SHUFFLING PROCESS 1(b): Consider two memory banks to store the Sbox array (M0 and M1) having Sbox data alternately in order. i.e. M0[0]=S[0], M0[1]=S[2], . . . M0[127]=S[254] and M1[0]=S[1], M1[1]=S[3], . . . M1[127]=S[255]. Per iteration of Sbox shuffle the following steps need to be performed (for i=0 to 255).

Read S[i]
    Calculate j (j=j+S[i]+K[i])mod 256
    Read S[j]
    Swap S[i] with S[j]

Having two half-size memory banks to store Sbox alternately allows for reading from both the banks simultaneously. Consider the first iteration of Sbox shuffling (i=0). Instead of reading just S[0] for the first shuffle Sbox iteration, S[1] is also read from the memory bank M1 to do a look ahead for Sbox shuffling.

Depending on the value of K[0], j can have an even or an odd value (corresponding to M0 or M1 banks respectively). The following four tables (case (a) through case (d)) represent all possible combinations of 'i's and 'j's lying in memory banks M0 and M1. Each table represents one Sbox Shuffle iteration.

Terminology Followed:
First Row of each table: Represents Read (R) and Write (W) for respective columns
Second Row of each table: Represents the memory bank M0 or M1 operated on
All but the first two rows of each table: operations done in the memory banks. Each row corresponds to one clock cycle in ascending order from top to down. i.e. Third row indicates the operations done in the first clock cycle of the iteration and so on.
First Column of each table: Read from Memory bank $M_0$
Second Column of each table: Write to Memory bank $M_0$
Third Column of each table: Read from Memory bank $M_1$
Fourth Column of each table: Write to Memory bank $M_1$
  $S_0$: S[0] Sbox memory access at location i=0
  $S_1$: S[1] Sbox memory access at location i=1
  $S_{j0}$: S[$j_{i=0}$] Sbox memory access at location $j_{i=0}$
  $S_{j1}$: S[$j_{i=1}$] Sbox memory access at location $j_{i=1}$
  $S_2$: S[2] Sbox memory access at location i=2
  $S_3$: S[3] Sbox memory access at location i=3
Case (1): Both $j_{i=0}$ and $j_{i=1}$ even, i.e. both address even address memory $M_0$
Case (2): $j_{i=0}$ even and $j_{i=1}$ odd,
  i.e. $j_{i=0}$ addresses $M_0$ and $j_{i=1}$ addresses odd address memory $M_1$
Case (3): $j_{i=0}$ odd and $j_{i=1}$ even, i.e. $j_{i=0}$ addresses $M_1$ and $j_{i=1}$ addresses $M_0$
Case (4): Both $j_{i=0}$ and $j_{i=1}$ odd, i.e. both address odd address memory $M_1$
  Note: The above four values are at the beginning of the iteration

TABLE

| | Case (1) | | | | | Case (4) | | | |
|---|---|---|---|---|---|---|---|---|---|
| | R $M_0$ | W $M_0$ | R $M_1$ | W $M_1$ | | R $M_0$ | W $M_0$ | R $M_1$ | W $M_1$ |
| 1 | $S_0$ | | $S_1$ | | 1 | $S_0$ | | $S_1$ | |
| 2 | $S_{j0}$ | $S_0$ | | | 2 | | | $S_{j0}$ | $S_0$ |
| 3 | $S_{j1}$ | $S_1$ | | | 3 | | | $S_{j1}$ | $S_1$ |
| 4 | $S_2$ | $S_{j0}$ | $S_3$ | $S_{j1}$ | 4 | $S_2$ | $S_{j0}$ | $S_3$ | $S_{j1}$ |

| | Case (2) | | | | | Case (3) | | | |
|---|---|---|---|---|---|---|---|---|---|
| | R $M_0$ | W $M_0$ | R $M_1$ | W $M_1$ | | R $M_0$ | W $M_0$ | R $M_1$ | W $M_1$ |
| 1 | $S_0$ | | $S_1$ | | 1 | $S_0$ | | $S_1$ | |
| 2 | $S_{j0}$ | $S_0$ | $S_{j1}$ | $S_1$ | 2 | $S_{j1}$ | $S_1$ | $S_{j0}$ | $S_0$ |
| 3 | $S_2$ | $S_{j0}$ | $S_3$ | $S_{j1}$ | 3 | $S_2$ | $S_{j0}$ | $S_3$ | $S_{j1}$ |

In the first row (clock cycle) of all four TABLES for Cases (1), (2), (3), (4), respective reading operations $S_0$ and $S_1$ simultaneously read the contents of Sbox byte S[i] for address i=0 out of even memory $M_0$ and read the contents of Sbox byte S[i] for i=1 out of odd memory $M_1$.

Now assume both of $j_{i=0}$ and $j_{i=1}$ are even (use TABLE for Case (1)). The next step (second row clock cycle) in one clock cycle generates address $j_{i=0}$ in fast address generation logic and then reads and transfers to a holding register the contents of Sbox byte $S_{j0}$ from $j_{i=0}$ location of even address memory $M_0$ since address $j_{i=0}$ is an even number in Case (1). The shuffle swap for i=0 is thereby begun. This operation is symbolized by the entry $S_{j0}$ in second row, first column. In the same clock cycle (second row, second column), the read value $S_0$ of S[i] for i=0 read in the first row is written to location $j_{i=0}$. Since address $j_{i=0}$ is an even number in Case (1), the write operation of value $S_0$ is asserted to even memory $M_0$. Now the shuffle swap of value $S_0$ is complete.

In the third row (clock cycle) of Case (1), note that since the calculated address $j_{i=1}$ lies in or points to the same memory $M_0$ as did address $j_{i=0}$, the Sbox byte $S_{j1}$ is not read in the same clock cycle as the read of $S_{j0}$ of row 2. In Case (1) it is the third cycle wherein Sbox byte $S_{j1}$ is read from even memory $M_0$ and byte $S_1$ is written to it.

This third step (third row clock cycle) in one clock cycle generates address $j_{i=1}$ in fast address generation logic and then reads to a holding register the contents of Sbox byte $S_{j1}$ from $j_{i=1}$ location of even address memory $M_0$ since address $j_{i=1}$ is an even number in Case (1). The shuffle swap for i=1 is thereby begun. This operation is symbolized by the entry $S_{j1}$ in third row, first column. In the same clock cycle (third row, second column), the read value $S_1$ of S[i] for i=1 read in the first row is written to location $j_{i=1}$. Since address $j_{i=1}$ is an even number in Case (1), the write operation of value $S_1$ is asserted to even memory $M_0$. Now the shuffle swap of value $S_1$ is complete.

In the fourth row (clock cycle) the next iteration of Sbox shuffling for byte pair $S_2$ and $S_3$ is started, analogous to the first row above. Also, in this fourth clock cycle, writing of $S_{j0}$ and $S_{j1}$ respectively completes their pending shuffle swaps to locations i=0 and i=1 in the respective even and odd memories $M_0$ and $M_1$ simultaneously.

The process of Case (1) continues by repeating the operations of row triplets 2, 3, 4, 2, 3, 4, etc. where the indices i in each row triplet are incremented by 2 with every repetition. Thus, 256 values of index i are processed in 385 clock cycles (4 cycles for i=0, 1 plus 3 cycles times the 127 remaining pairs of successive index i values.) On the very last $257^{th}$ clock cycle of Case (1), the byte entries in second and fourth columns are as shown for row 4 in the table, but the new-byte entries in first and third columns are omitted.

The TABLES for Case (2) and Case (3) are similar to the TABLE for Case (1) and differ wherein the operations in clock cycle row 3 of Case (1) are able to be moved into the unused columns of clock cycle row 2. Here addresses $j_{i=0}$ and $j_{i=1}$ lie in different memory banks $M_0$ and $M_1$ (Case (2) and Case (3)), and the readings of $S_{j0}$ and $S_{j1}$ are done in the same cycle 2 as demonstrated in each Table for Case (2) and (3). Also, the writing of $S_0$ and $S_1$ are also done in the same cycle 2 as shown in each Table for Case (2) and (3).

Advantageously further increased efficiency of memory use occurs because both even memory and odd memory $M_0$ and $M_1$ are simultaneously used in clock cycle row 2 as shown in the TABLES for Case (2) and Case (3). This result is conferred by the condition of Cases (2) and (3) that $j_{i=0}$ and $j_{i=1}$ are complementary in their even- and odd-ness. The TABLE for Case (2) differs from the TABLE of Case (3) in having the memory $M_0$ columns reversed with the memory $M_1$ columns, reflecting the reversal of designated memories into which the accesses occur.

The TABLE for Case (4) is similar to the TABLE for Case (1) and differs wherein the roles of the even memory and odd memory $M_0$ and $M_1$ are reversed so that most accesses lie in odd memory $M_1$ because of the condition that both $j_{i=0}$ and $j_{i=1}$ are odd.

Let it be emphasized that each successive shuffle iteration has the operations pertaining to that successive iteration of a particular Case out of the four (4) Shuffle Cases. Furthermore, when the iteration is begun, the identity of the particular Case is not necessarily known, and operations remarkably "learn" as the operations proceed which Case the operations are in so that the operations proceed further to complete the iteration in a manner appropriate to that Case.

ENCRYPTION/DECRYPTION PROCESS 2: Similar look ahead is applied to the step 2. i.e. Encryption/decryption has two extra reads ($S_{r0}$ and $S_{r1}$) from Sbox shuffling. The following tables depict all possible combinations of memory bank access possible.

Terminology Followed:

Following tables depicts the memory accesses (first and second column representing read and write accesses to memory bank zero $M_0$ respectively and the third and fourth to memory bank $M_1$) in all the possible cases. Each row represents clock cycles (from top to bottom) and each box contains the particular memory access done in the corresponding clock cycle on the particular port (read/write).

$S_0$>>Sbox memory access at location i=0—ith thread
$S_{j0}$>>Sbox memory access at location $j_{i=0}$—ith thread
$S_{r0}$>>Sbox memory access at location $t_{i=0}$—ith thread
$S_1$>>Sbox memory access at location i=1—(i+1)th thread
$S_{j1}$>>Sbox memory access at location $j_{i=1}$—(i+1)th thread
$S_{r1}$>>Sbox memory access at location $t_{i=1}$—(i+1)th thread
$S_2$>>Sbox memory access at location i=2—next iteration
$S_3$>>Sbox memory access at location i=3—next iteration Case (1): Both $j_{i=0}$ and $j_{i=1}$ even, i.e. both address even address memory $M_0$ Case (2): $j_{i=0}$ even and $j_{i=1}$ odd,
i.e. $j_{i=0}$ addresses $M_0$ and $j_{i=1}$ addresses odd address memory $M_1$ Case (3): $j_{i=0}$ odd and $j_{i=1}$ even, i.e. $j_{i=0}$ addresses $M_1$ and $j_{i=1}$ addresses $M_0$ Case (4): Both $j_{i=0}$ and $j_{i=1}$ odd, i.e. both address odd address memory $M_1$ SubCase (a): Both $t_{i=0}$ and $t_{i=1}$ even, i.e. both address even address memory $M_0$ SubCase (b): $t_{i=0}$ even and $t_{i=1}$ odd,
i.e. $t_{i=0}$ addresses $M_0$ and $t_{i=1}$ addresses odd address memory $M_1$ SubCase (c): $t_{i=0}$ odd and $t_{i=1}$ even, i.e. $t_{i=0}$ addresses $M_1$ and $t_{i=1}$ addresses $M_0$ SubCase (d): Both $t_{i=0}$ and $t_{i=1}$ odd, i.e. both address odd address memory $M_1$ Case (1): Both $j_{i=0}$ and $j_{i=1}$ even, i.e. both address even address memory $M_0$

| SubCase (a) | | | | SubCase (b) | | | | SubCase (c) | | | | SubCase (d) | | | |
|---|---|---|---|---|---|---|---|---|---|---|---|---|---|---|---|
| $M_0$ | $M_0$ | $M_1$ | $M_1$ | $M_0$ | $M_0$ | $M_1$ | $M_1$ | $M_0$ | $M_0$ | $M_1$ | $M_1$ | $M_0$ | $M_0$ | $M_1$ | $M_1$ |
| $S_0$ | | | $S_1$ | $S_0$ | | | $S_1$ | $S_0$ | | | $S_1$ | $S_0$ | | | $S_1$ |
| $S_{j0}$ | $S_0$ | | | $S_{j0}$ | $S_0$ | | | $S_{j0}$ | $S_0$ | | | $S_{j0}$ | $S_0$ | | |
| $S_{j1}$ | $S_1$ | | | $S_{j1}$ | $S_1$ | | | $S_{j1}$ | $S_1$ | $S_{r0}$ | | $S_{j1}$ | $S_1$ | $S_{r0}$ | |
| $S_{r0}$ | $S_{j0}$ | | | $S_{r0}$ | $S_{j0}$ | $S_{r1}$ | $S_{j1}$ | $S_{r1}$ | $S_{j0}$ | | $S_{j1}$ | | | $S_{j0}$ | $S_{r1}$ | $S_{j1}$ |
| $S_{r1}$ | | | $S_{j1}$ | $S_2$ | | | $S_3$ | $S_2$ | | | $S_3$ | $S_2$ | | | $S_3$ |
| $S_2$ | | | $S_3$ | | | | | | | | | | | | |

Case (2): $j_{i=0}$ even and $j_{i=1}$ odd,
i.e. $j_{i=0}$ addresses $M_0$ and $j_{i=1}$ addresses odd address memory $M_1$

| SubCase (a) | | | | SubCase (b) | | | | SubCase (c) | | | | SubCase (d) | | | |
|---|---|---|---|---|---|---|---|---|---|---|---|---|---|---|---|
| $M_0$ | $M_0$ | $M_1$ | $M_1$ | $M_0$ | $M_0$ | $M_1$ | $M_1$ | $M_0$ | $M_0$ | $M_1$ | $M_1$ | $M_0$ | $M_0$ | $M_1$ | $M_1$ |
| $S_0$ | | | $S_1$ | $S_0$ | | | $S_1$ | $S_0$ | | | $S_1$ | $S_0$ | | | $S_1$ |
| $S_{j0}$ | $S_0$ | $S_{j1}$ | $S_1$ | $S_{j0}$ | $S_0$ | $S_{j1}$ | $S_1$ | $S_{j0}$ | $S_0$ | $S_{j1}$ | $S_1$ | $S_{j0}$ | $S_0$ | $S_{j1}$ | $S_1$ |
| $S_{r0}$ | $S_{j0}$ | | | $S_{r0}$ | $S_{j0}$ | $S_{r1}$ | $S_{j1}$ | $S_{r1}$ | $S_{j0}$ | $S_{r0}$ | $S_{j1}$ | | | $S_{j0}$ | $S_{r0}$ | |
| $S_{r1}$ | | | $S_{j1}$ | $S_2$ | | | $S_3$ | $S_2$ | | | $S_3$ | | | | $S_{r1}$ | $S_{j1}$ |
| $S_2$ | | | $S_3$ | | | | | | | | | $S_2$ | | | $S_3$ |

Case (3): $j_{i=0}$ odd and $j_{i=1}$ even, i.e. $j_{i=0}$ addresses $M_1$ and $j_{i=1}$ addresses $M_0$

| SubCase (a) | | | | SubCase (b) | | | | SubCase (c) | | | | SubCase (d) | | | |
|---|---|---|---|---|---|---|---|---|---|---|---|---|---|---|---|
| $M_0$ | $M_0$ | $M_1$ | $M_1$ | $M_0$ | $M_0$ | $M_1$ | $M_1$ | $M_0$ | $M_0$ | $M_1$ | $M_1$ | $M_0$ | $M_0$ | $M_1$ | $M_1$ |
| $S_0$ | | | $S_1$ | $S_0$ | | | $S_1$ | $S_0$ | | | $S_1$ | $S_0$ | | | $S_1$ |
| $S_{j1}$ | $S_1$ | $S_{j0}$ | $S_0$ | $S_{j1}$ | $S_1$ | $S_{j0}$ | $S_0$ | $S_{j1}$ | $S_1$ | $S_{j0}$ | $S_0$ | $S_{j1}$ | $S_1$ | $S_{j0}$ | $S_0$ |
| $S_{r0}$ | $S_{j0}$ | | | $S_{r0}$ | $S_{j0}$ | $S_{r1}$ | $S_{j1}$ | $S_{r1}$ | $S_{j0}$ | $S_{r0}$ | $S_{j1}$ | | | $S_{j0}$ | $S_{r0}$ | |
| $S_{r1}$ | | | $S_{j1}$ | $S_2$ | | | $S_3$ | $S_2$ | | | $S_3$ | | | | $S_{r1}$ | $S_{j1}$ |
| $S_2$ | | | $S_3$ | | | | | | | | | $S_2$ | | | $S_3$ |

Case (4): Both $j_{i=0}$ and $j_{i=1}$ odd, i.e. both address odd address memory $M_1$

| SubCase (a) | | | | SubCase (b) | | | | SubCase (c) | | | | SubCase (d) | | | |
|---|---|---|---|---|---|---|---|---|---|---|---|---|---|---|---|
| $M_0$ | $M_0$ | $M_1$ | $M_1$ | $M_0$ | $M_0$ | $M_1$ | $M_1$ | $M_0$ | $M_0$ | $M_1$ | $M_1$ | $M_0$ | $M_0$ | $M_1$ | $M_1$ |
| $S_0$ | | $S_1$ | | $S_0$ | | $S_1$ | | $S_0$ | | $S_1$ | | $S_0$ | | $S_1$ | |
| | $S_{j0}$ | $S_0$ | | | $S_{j0}$ | $S_0$ | | | $S_{j0}$ | $S_0$ | | | $S_{j0}$ | $S_0$ | |
| $S_{r0}$ | $S_{j0}$ | $S_{j1}$ | $S_1$ | $S_{r0}$ | $S_{j0}$ | $S_{j1}$ | $S_1$ | | | $S_{j1}$ | $S_1$ | | $S_{j0}$ | $S_{r0}$ | |
| $S_{t1}$ | | | $S_{j1}$ | | | $S_{t1}$ | $S_{j1}$ | $S_{t1}$ | $S_{j0}$ | $S_{r0}$ | $S_{j1}$ | | | $S_{j1}$ | $S_1$ |
| $S_2$ | | $S_3$ | | $S_2$ | | $S_3$ | | $S_2$ | | $S_3$ | | | | $S_{t1}$ | $S_{j1}$ |
| | | | | | | | | | | | | | $S_2$ | $S_3$ | |

In the encryption/decryption process, sixteen tables (4×4=16) are shown arising from four Cases 1, 2, 3, 4 wherein possible pairs of addresses ($j_{i=0}$, $j_{i=1}$) are even,even; even,odd; odd,even; odd,odd corresponding to the subscripts of $S_{j0}$ and $S_{j1}$. Further, there are for each Case four SubCases (a), (b), (c), (d) wherein possible pairs of addresses ($t_{i=0}$, $t_{i=1}$) are independently even, even; even,odd; odd,even; odd,odd corresponding to the subscripts of $S_{t0}$ and $S_{t1}$. Tables for each case are shown in four groups (Cases 1, 2, 3, 4) of four tables (SubCases (a), (b), (c), (d)). The tables have been cosmetically reduced in size by omitting the clock cycle left-hand column and the RWRW headings, all these being understood. The memory designations $M_0M_0M_1M_1$ remain. Each Table represents one full iteration of a pair of respective threads for Sbox addresses i, i+1.

In all sixteen possibilities, the first row (clock cycle) of all TABLES for SubCases (a), (b), (c), (d), shows respective reading operations $S_0$ and $S_1$ simultaneously read the contents of Sbox byte S[i] for address i=0 out of even memory $M_0$ and read the contents of Sbox byte S[i] for i=1 out of odd memory $M_1$. In all sixteen tables, the next iteration increments both the addresses i and i+1 by two (2) in all the rows.

The operations are executed through each iteration in an inner loop, whence they successively advance to each next iteration over 256 iterations in all, whereupon operations loop back by an outer loop to i=0, i+1=1 as explicitly tabulated here and execute another 256 iterations repeatedly during encryption of an outgoing information stream. In clock cycles, the iterations are either three (3), four (4), or five (5) clock cycles in duration depending on which possibility is tabulated. For conciseness, one Case/SubCase example of each these 3-, 4-, and 5-cycle iterations is respectively described in detail below. Other Case/SubCases are then left to the reader whereby an understanding of the description of those other Case/SubCases follows straightforwardly because of symmetries in the tables.

Let it be emphasized that each successive iteration has the operations pertaining to that successive iteration of a particular Case/SubCase out of the sixteen (16) Case/SubCases. Furthermore, when the iteration is begun, the identity of the particular Case/SubCase is not necessarily known, and operations remarkably "learn" as the operations proceed which Case/SubCase the operations are in so that the operations proceed further to complete the iteration in a manner appropriate to that Case/Subcase. Various embodiments make up to the maximum number of simultaneous reads that a memory $M_0$ or memory $M_1$ permits, and make up to the maximum number of simultaneous writes that a memory $M_0$ or memory $M_1$ permits. For the present embodiment having two 2-port memories each of 128 bytes, the maximum number of simultaneous read that a memory $M_0$ or memory $M_1$ permits is exactly one each, and the maximum number writes that a memory $M_0$ or memory $M_1$ permits is also exactly one each. In other two 2-port memory embodiments, constraints observed may vary.

Furthermore, in this two 2-port memory embodiment, a result of computation is written at least one clock cycle later than the last read of an operand from memory $M_0$ or memory $M_1$ on which the computation depended. In other embodiments, having appropriate fast logic and memory hardware, the read is performed in the first half of a clock cycle and the write is accomplished as soon as the second half of the same cycle.

In general, the particular process operations tabulated are sufficient to execute a given Case/SubCase successfully, but those particular operations may have alternative timings (row positions) in different embodiments of the same memory type, and also be sufficient to execute the given Case/SubCase successfully.

Also, note that another similar set of operations may be executing concurrently with and independently of the encryption operations, wherein the similar operations pertain an incoming information stream and are timed in a manner related to the timing of the incoming data stream during decryption of that incoming information stream. However, for conciseness of description, the description of the operations here is detailed for either encryption or decryption, it being understood that the complementary decryption or encryption operations may be executing concurrently and independently.

For any given Case number 1-4, the operations in the first two clock cycles are identical in all four TABLES for SubCases (a), (b), (c), (d) of that Case number. In all sixteen possibilities, the first two clock cycles operations of Cases 1, 2, 3, 4 for Encryption/Decryption respectively match those of Shuffle Cases (1), (2), (3), (4) described earlier above.

Five Clock Cycle Iteration

One example of a 5-cycle iteration is Case 1, SubCase (a) (use TABLE for Case 1, SubCase (a)). There, both of $j_{i=0}$ and $j_{i=1}$ are even and both of $t_{i=0}$ and $t_{i=1}$ are even. Another 5-cycle Case/SubCase is 4(d) for a total of two (2) five cycle Case/SubCases.

In Case 1, SubCase (a), the first step (first row) reads bytes $S_0$ and $S_1$ from respective addresses i=0 and i=1. The next step (second row clock cycle) in one clock cycle generates address $j_{i=0}$ in fast address generation logic and then reads and transfers to a holding register the contents of Sbox byte $S_{j0}$ from $j_{i=0}$ location of even address memory $M_0$ since address $j_{i=0}$ is an even number in Case (1). The encryption swap for i=0 is thereby begun. This operation is symbolized by the entry $S_{j0}$ in second row, first column. In the same clock cycle (second row, second column), the read value $S_0$ of S[i] for i=0 read in the first row is written to location $j_{i=0}$. Since address $j_{i=0}$ is an even number in Case (1), the write operation of value $S_0$ is asserted to even memory $M_0$. Now the swap of value $S_0$ with $S_{j0}$ is half complete.

In the third row (third clock cycle) of Case 1, SubCase (a), note that since the calculated address $j_{i=1}$ lies in or points to the same memory $M_0$ as did address $j_{i=0}$, the Sbox byte $S_{j1}$ is not read in the same clock cycle as the read of $S_{j0}$ of row 2. In Case 1 it is the third cycle wherein Sbox byte $S_{j1}$ is read from even memory $M_0$. Also in that third cycle, byte $S_1$ is written to it.

Even more specifically, this third step (third row clock cycle) in one clock cycle generates address $j_{i=1}$ in fast address generation logic and then reads and transfers to a holding register the contents of Sbox byte $S_{j1}$ from the byte location having address $j_{i=1}$ in even address memory $M_0$ since address $j_{i=1}$ is an even number in Case 1. The swap for i=1 is thereby begun. This operation is symbolized by the entry $S_{j1}$ in third row, first column. In the same clock cycle (third row, second column), the read value $S_1$ of S[i] for i=1 read in the first row is written to the byte location having address $j_{i=1}$. Since address $j_{i=1}$ is an even number in Case 1, the write operation of value $S_1$ is asserted to even memory $M_0$. Now the swap of value $S_1$ with $S_{j1}$ is half complete.

Operations of the fourth row (fourth clock cycle) generate address $t_{i=0}$ in fast address generation logic and then reads and transfers to a key holding register for i=0 the contents of Sbox byte $S_{t0}$ from the byte location having address $t_{i=0}$ in even address memory $M_0$ since address $t_{i=0}$ is an even number in SubCase (a). Also, in this fourth clock cycle, writing $S_{j0}$ completes its pending swap to location i=0 in the even memory $M_0$.

Operations in the fifth row (fifth clock cycle) in one clock cycle generate address $t_{i=1}$ in fast address generation logic and then reads and transfers to a key holding register for i=1 the contents of Sbox byte $S_{t1}$ from the byte location having address $t_{i=1}$ in even address memory $M_0$ since address $t_{i=1}$ is an even number in SubCase (a). Also, in this fifth clock cycle, writing of $S_{j1}$ respectively completes its pending swap to location i=1 in the odd memory $M_1$. The iteration is completed.

In the sixth row (sixth clock cycle) the next iteration of encryption for byte pair $S_2$ and $S_3$ is started, analogous to the first row above.

Four Clock Cycle Iteration

One example of a 4-cycle iteration is in Case 2, SubCase (d) (use TABLE for Case 1, SubCase (a)). There, address $j_{i=0}$ is even and address $j_{i=1}$ is odd and both of $t_{i=0}$ and $t_{i=1}$ are odd. The 4-cycle Case/SubCases are 1(b), 1(c), 1(d), 2(a), 2(d), 3(a), 3(d), 4(a), 4(b), and 4(c) for a total of ten (10) four cycle Case/SubCases.

In the TABLE for Case 2, SubCase (d), the first step (first row) reads bytes $S_0$ and $S_1$ from respective addresses i=0 and i=1. The next step (second row clock cycle) in one clock cycle generates address $j_{i=0}$ in fast address generation logic and then reads and transfers to a holding register the contents of Sbox byte $S_{j0}$ from $j_{i=0}$ location of even address memory $M_0$ since address $j_{i=0}$ is an even number in Case (2). The encryption swap for i=0 is thereby begun. This operation is symbolized by the entry $S_{j0}$ in second row, first column. In the same clock cycle (second row, second column), the read value $S_0$ of S[i] for i=0 read in the first row is written to location $j_{i=0}$. Since address $j_{i=0}$ is an even number in Case (2), the write operation of value $S_0$ is asserted to even memory $M_0$. Now the swap of value $S_0$ with $S_{j0}$ is half complete.

In the same second row (second clock cycle) of Case 2, SubCase (d), note that since the calculated address $j_{i=1}$ lies in or points to a different memory $M_1$ than did address $j_{i=0}$, the Sbox byte $S_{j1}$ can be and is now read in the same second clock cycle as the read of $S_{j0}$ of row 2. Also in that same second cycle, byte $S_1$ is written to the odd memory $M_1$.

Even more specifically, this second step (second row clock cycle) in one clock cycle generates address $j_{i=1}$ in fast address generation logic and then reads and transfers to another holding register the contents of Sbox byte $S_{j1}$ from the byte location having address $j_{i=1}$ in odd address memory $M_1$ since address $j_{i=1}$ is an odd number in Case 2. The swap for i=1 is thereby begun. This operation is symbolized by the entry $S_{j1}$ in second row, third column in TABLE 2(d). In the same second clock cycle (second row, fourth column), the read value $S_1$ of S[i] for address i=1 read in the first row is written to the byte location having address $j_{i=1}$. Since address $j_{i=1}$ is an odd number in Case 2, the write operation of value $S_1$ is asserted to odd memory $M_1$. Now the swap of value $S_1$ with $S_{j1}$ is half complete.

Operations of the third row (third clock cycle) generate address $t_{i=0}$ in fast address generation logic and then read and transfer to a key holding register for i=0 the contents of Sbox byte $S_{t0}$ from the byte location having address $t_{i=0}$ in odd address memory $M_1$ since address $t_{i=0}$ is an odd number in SubCase (d). Also, in this third clock cycle, writing of byte $S_{j0}$ completes its pending swap to location i=0 in the even memory $M_0$.

Operations in the fourth row (fourth clock cycle) in one clock cycle generate address $t_{i=1}$ in fast address generation logic and then read and transfer to a key holding register for i=1 the contents of Sbox byte $S_{t1}$ from the byte location having address $t_{i=1}$ in odd address memory $M_1$ since address $t_{i=1}$ is an odd number in SubCase (d). Also, in this fourth clock cycle, writing of $S_{j1}$ respectively completes its pending swap to location i=1 in the odd memory $M_1$. The iteration is completed.

In the fifth row (fifth clock cycle) the next iteration of encryption for byte pair $S_2$ and $S_3$ is started, analogous to the first row above.

Three Clock Cycle Iteration

One example of a 3-cycle iteration is in Case 3, SubCase (c) (use TABLE for Case 3, SubCase (c)). There, address $j_{i=0}$ is odd and address $j_{i=1}$ is even. Address $t_{i=0}$ is odd and address $t_{i=1}$ is even. The 3-cycle Case/SubCases are 2(b), 2(c), 3(b), and 3(c) for a total of four (4) three cycle Case/SubCases.

In the TABLE for Case 3, SubCase (c), the first step (first row) reads bytes $S_0$ and $S_1$ from respective addresses i=0 and i=1. The next step (second row clock cycle) in one clock cycle generates address $j_{i=0}$ in fast address generation logic and then reads and transfers to a holding register the contents of Sbox byte $S_{j0}$ from $j_{i=0}$ location of odd address memory $M_1$ since address $j_{i=0}$ is an odd number in Case (3). The encryption swap for i=0 is thereby begun. This operation is symbolized by the entry $S_{j0}$ in second row, third column. In the same clock cycle (second row, fourth column), the read value $S_0$ of S[i] for i=0 read in the first row is written to location $j_{i=0}$. Since address $j_{i=0}$ is an odd number in Case (3), the write operation of value $S_0$ is asserted to odd memory $M_1$ Now the swap of value $S_0$ with $S_{j0}$ is half complete.

In the same second row (second clock cycle) of Case 3, SubCase (c), note that since the calculated even address $j_{i=1}$ lies in or points to a different memory $M_0$ than did odd address $j_{i=0}$, the Sbox byte $S_{j1}$ can be and is now read in the same second clock cycle as the read of $S_{j0}$ of row 2. Also in that same second cycle, byte $S_1$ is written to the even memory $M_0$.

Even more specifically, this second step (second row clock cycle) in one clock cycle generates address $j_{i=1}$ in fast address generation logic and then reads and transfers to a another holding register the contents of Sbox byte $S_{j1}$ from the byte location having address $j_{i=1}$ in even address memory $M_0$ since address $j_{i=1}$ is an even number in Case 3. The swap for i=1 is thereby begun. This operation is symbolized by the entry $S_{j1}$ in second row, first column in TABLE 3(c). In the same second clock cycle (second row, second column), the read value $S_1$ of S[i] for address i=1 read in the first row is written to the byte location having address $j_{i=1}$. Since address $j_{i=1}$ is an even number in Case 3, the write operation of value $S_1$ is asserted to even memory $M_0$. Now the swap of value $S_1$ with $S_{j1}$ is half complete.

Operations of the third row (third clock cycle) generate address $t_{i=0}$ in fast address generation logic and then read and transfer to a key holding register for i=0 the contents of Sbox byte $S_{r0}$ from the byte location having address $t_{i=0}$ in even address memory $M_0$ since address $t_{i=0}$ is an even number in SubCase (c). Also, in this third clock cycle, writing of byte $S_{j0}$ completes its pending swap to location i=0 in the even memory $M_0$.

Operations in the same third row (third clock cycle) in one clock cycle generate address $t_{i=1}$ in fast address generation logic and then read and transfer to a key holding register for i=1 the contents of Sbox byte $S_{r1}$ from the byte location having address $t_{i=1}$ in even address memory $M_0$ (third row, first column) since address $t_{i=1}$ is an even number in SubCase (c). Also, in this third clock cycle, writing of $S_{j1}$ (third row, fourth column) respectively completes its pending swap to location i=1 in the odd memory $M_1$. The iteration is completed.

In the fourth row (fourth clock cycle) the next iteration of encryption for byte pair $S_2$ and $S_3$ is started, analogous to the first row above.

Two 2-Port Half-Memories, Double-Byte Throughput with High Regularity Process Tables for Fewer Gates In general, as earlier pointed out, the particular process operations tabulated are sufficient to execute a given Case/SubCase successfully, but those particular operations may have alternative timings (row positions) in different embodiments of the same memory type, and also be sufficient to execute the given Case/SubCase successfully. Also, the number of gates and hence chip area used for the circuitry to implement the process operations may vary. It is believed that, without any reduction in throughput, the process represented by the tables hereinbelow advantageously uses even fewer gates and chip area to implement them than is the case with the process tables example hereinabove. Throughput is not reduced because each Case/Subcase has the same number of cycles per iteration in the tables hereinbelow as the corresponding Case/Subcase in the tables example hereinabove.

Case (1): Both $j_{i=0}$ and $j_{i=1}$ even, i.e. both address even address memory $M_0$

| SubCase (a) | | | | SubCase (b) | | | | SubCase (c) | | | | SubCase (d) | | | |
|---|---|---|---|---|---|---|---|---|---|---|---|---|---|---|---|
| $M_0$ | $M_0$ | $M_1$ | $M_1$ | $M_0$ | $M_0$ | $M_1$ | $M_1$ | $M_0$ | $M_0$ | $M_1$ | $M_1$ | $M_0$ | $M_0$ | $M_1$ | $M_1$ |
| $S_0$ | | $S_1$ | | $S_0$ | | $S_1$ | | $S_0$ | | $S_1$ | | $S_0$ | | $S_1$ | |
| $S_{j0}$ | $S_0$ | | | $S_{j0}$ | $S_0$ | | | $S_{j0}$ | $S_0$ | | | $S_{j0}$ | $S_0$ | | |
| $S_{j1}$ | $S_1$ | | | $S_{j1}$ | $S_1$ | | | $S_{j1}$ | $S_1$ | | | $S_{j1}$ | $S_1$ | $S_{r0}$ | |
| $S_{r0}$ | | | | $S_{r0}$ | | $S_{r1}$ | | $S_{r1}$ | | $S_{r0}$ | | | | $S_{r1}$ | |
| $S_{r1}$ | | | | $S_2$ | $S_{j0}$ | $S_3$ | $S_{j1}$ | $S_2$ | $S_{j0}$ | $S_3$ | $S_{j1}$ | $S_2$ | $S_{j0}$ | $S_3$ | $S_{j1}$ |
| $S_2$ | $S_{j0}$ | $S_3$ | $S_{j1}$ | | | | | | | | | | | | |

Case (2): $j_{i=0}$ even and $j_{i=1}$ odd, i.e. $j_{i=0}$ addresses $M_0$ and $j_{i=1}$ addresses odd address memory $M_1$

| SubCase (a) | | | | SubCase (b) | | | | SubCase (c) | | | | SubCase (d) | | | |
|---|---|---|---|---|---|---|---|---|---|---|---|---|---|---|---|
| $M_0$ | $M_0$ | $M_1$ | $M_1$ | $M_0$ | $M_0$ | $M_1$ | $M_1$ | $M_0$ | $M_0$ | $M_1$ | $M_1$ | $M_0$ | $M_0$ | $M_1$ | $M_1$ |
| $S_0$ | | $S_1$ | | $S_0$ | | $S_1$ | | $S_0$ | | $S_1$ | | $S_0$ | | $S_1$ | |
| $S_{j0}$ | $S_0$ | $S_{j1}$ | $S_1$ | $S_{j0}$ | $S_0$ | $S_{j1}$ | $S_1$ | $S_{j0}$ | $S_0$ | $S_{j1}$ | $S_1$ | $S_{j0}$ | $S_0$ | $S_{j1}$ | $S_1$ |
| $S_{r0}$ | | | | $S_{r0}$ | | $S_{r1}$ | | $S_{r1}$ | | $S_{r0}$ | | | | $S_{r0}$ | |
| $S_{r1}$ | | | | $S_2$ | $S_{j0}$ | $S_3$ | $S_{j1}$ | $S_2$ | $S_{j0}$ | $S_3$ | $S_{j1}$ | | | $S_{r1}$ | |
| $S_2$ | $S_{j0}$ | $S_3$ | $S_{j1}$ | | | | | | | | | $S_2$ | $S_{j0}$ | $S_3$ | $S_{j1}$ |

Case (3): $j_{i=0}$ odd and $j_{i=1}$ even, i.e. $j_{i=0}$ addresses $M_1$ and $j_{i=1}$ addresses $M_0$

| SubCase (a) | | | | SubCase (b) | | | | SubCase (c) | | | | SubCase (d) | | | |
|---|---|---|---|---|---|---|---|---|---|---|---|---|---|---|---|
| $M_0$ | $M_0$ | $M_1$ | $M_1$ | $M_0$ | $M_0$ | $M_1$ | $M_1$ | $M_0$ | $M_0$ | $M_1$ | $M_1$ | $M_0$ | $M_0$ | $M_1$ | $M_1$ |
| $S_0$ | | $S_1$ | | $S_0$ | | $S_1$ | | $S_0$ | | $S_1$ | | $S_0$ | | $S_1$ | |
| $S_{j1}$ | $S_1$ | $S_{j0}$ | $S_0$ | $S_{j1}$ | $S_1$ | $S_{j0}$ | $S_0$ | $S_{j1}$ | $S_1$ | $S_{j0}$ | $S_0$ | $S_{j1}$ | $S_1$ | $S_{j0}$ | $S_0$ |
| $S_{r0}$ | | | | $S_{r0}$ | | $S_{r1}$ | | $S_{r1}$ | | $S_{r0}$ | | | | $S_{r0}$ | |
| $S_{r1}$ | | | | $S_2$ | $S_{j0}$ | $S_3$ | $S_{j1}$ | $S_2$ | $S_{j0}$ | $S_3$ | $S_{j1}$ | | | $S_{r1}$ | |
| $S_2$ | $S_{j0}$ | $S_3$ | $S_{j1}$ | | | | | | | | | $S_2$ | $S_{j0}$ | $S_3$ | $S_{j1}$ |

Case (4): Both $j_{i=0}$ and $j_{i=1}$ odd, i.e. both address odd address memory $M_1$

| SubCase (a) | | | | SubCase (b) | | | | SubCase (c) | | | | SubCase (d) | | | |
|---|---|---|---|---|---|---|---|---|---|---|---|---|---|---|---|
| $M_0$ | $M_0$ | $M_1$ | $M_1$ | $M_0$ | $M_0$ | $M_1$ | $M_1$ | $M_0$ | $M_0$ | $M_1$ | $M_1$ | $M_0$ | $M_0$ | $M_1$ | $M_1$ |
| $S_0$ | $S_1$ | | | $S_0$ | | $S_1$ | | $S_0$ | | $S_1$ | | $S_0$ | | $S_1$ | |
| | $S_{j0}$ | $S_0$ | | | $S_{j0}$ | $S_0$ | | | $S_{j0}$ | $S_0$ | | | $S_{j0}$ | $S_0$ | |
| $S_{r0}$ | $S_{j1}$ | $S_1$ | | | $S_{j1}$ | $S_1$ | | | $S_{j1}$ | $S_1$ | | | $S_{j1}$ | $S_1$ | |
| $S_{t1}$ | | | | $S_{r0}$ | | $S_{t1}$ | | $S_{t1}$ | | $S_{r0}$ | | | | $S_{r0}$ | |
| $S_2$ | $S_{j0}$ | $S_3$ | $S_{j1}$ | $S_2$ | $S_{j0}$ | $S_3$ | $S_{j1}$ | $S_2$ | $S_{j0}$ | $S_3$ | $S_{j1}$ | | | $S_{t1}$ | |
| | | | | | | | | | | | | $S_2$ | $S_{j0}$ | $S_3$ | $S_{j1}$ |

In each of the tables just above, the swap completion writes of $S_{j0}$ and $S_{j1}$ both occur in the row where the values $S_2$ and $S_3$ for the next iteration are both read. Notice these writes were advanced by at least one cycle earlier in the set of encryption/decryption tables for cases 1(a) through 4(d) set forth earlier hereinabove. However, this is not a problem for the process in the tables just above, because advantageously the key-generation values $S_{r0}$ and $S_{r1}$ both are generated before the next iteration, and the S-Box updating by swap completion writes of $S_{j0}$ and $S_{j1}$ is just-in-time as the next iteration commences.

Another example, in Case/Subcase 4(d) as illustrated, reverses the order of cycle rows 3 and 4 wherein the cycle that reads value $S_{r0}$ is reversed with the cycle that writes $S_1$ and reads value $S_{j1}$. Furthermore, other embodiments could have mixtures of various orderings of the various swap completion writes and some of the reads among the sixteen Case/SubCase tables. Thus, the illustrated tables show but two of many embodiments in the two dual-port half-memory double-byte throughput group.

Figure 3:
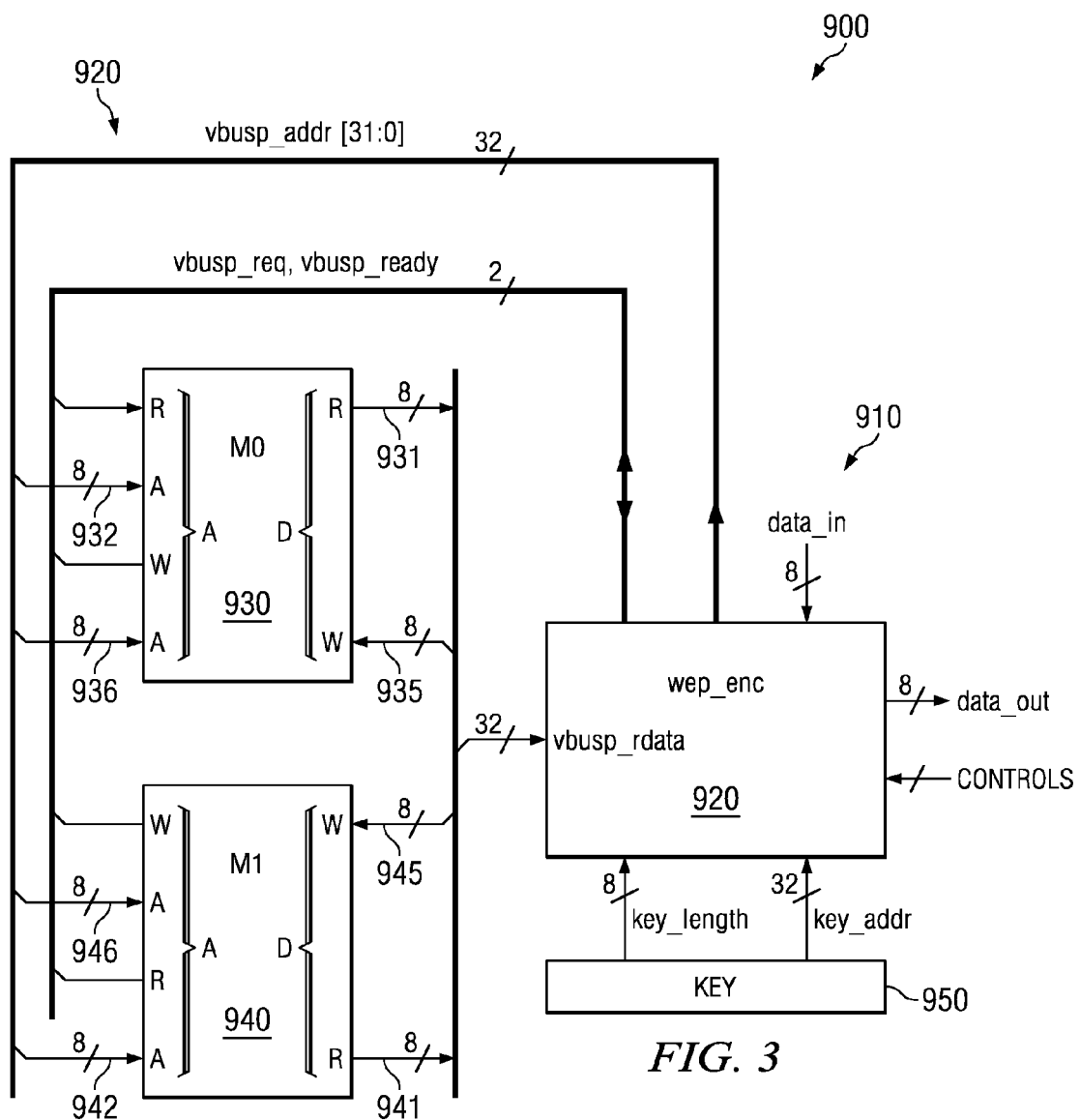
FIG. 3 is a schematic diagram of inventive circuitry for implementation of the improved cell phone and in the improved WLAN system of, all as shown in FIGS. 1 and 2A through 2G.

In FIG. 3, an encryption block 900 includes an encryption circuit wep_enc 910 interconnected with a memory 920 having a first 128-byte two-port memory M0 930 and a second 128-byte two-port memory M1 940. Encryption circuit 910 is responsible for the top level functioning and interfacing of the internal blocks and the external system. The encryption circuit 910 is coupled to a key circuit KEY 950.

An address bus vbusp_addr[31:0] conveys four respective addresses generated by encryption circuit 910 on byte-wide lines 932, 936, 942, 946 to the corresponding A address inputs of the read port of memory M0 930, the write port of memory M0 930, the read port of memory M1 940, and the write port of memory M1 940. Handshake control lines vbusp_req (Request) and vbusp_ready (Ready) are respectively connected to corresponding enable inputs of memory M0 930 and memory M1 940.

A data bus vbusp_rdata [31:0] conveys as many as four concurrent respective S-Box data bytes read or written by encryption circuit 910 on byte-wide lines 931, 935, 941, 945 to or from the corresponding output of the read port of memory M0 930, the input (for S-Box data to be written) of the write port of memory M0 930, the output of the read port of memory M1 940, and the input (for S-Box data to be written) of the write port of memory M1 940. These inputs and outputs for S-Box data relative to memories M0 and M1 are not to be confused with the next paragraph description of distinct data buses data_in and data_out along which streaming data passes in the encryption/decryption process.

In FIG. 3, Key circuit 950 provides an 8 bit key length datum to encryption circuit 910. Key circuit 950 also provides a key on a 32-bit bus key_addr to encryption circuit 910. Control lines CONTROLS supply signals to start and reset the encryption circuit 910. Unencrypted data bytes are successively supplied to encryption circuit 910 on an 8-wide input data bus data_in. Real time processing by encryption circuit 910 produces and outputs encrypted data bytes successively supplied from encryption circuit 910 on an 8-wide output data bus data_out. Where a symmetric encryption/decryption process is used, as illustrated, the encryption circuit 910 is also operative for decryption when encrypted data bytes are successively supplied to circuit 910 on the 8-wide input data bus data_in. Real time processing by circuit 910 produces and outputs decrypted data bytes successively supplied from circuit 910 on the 8-wide output data bus data_out.

Thus, as shown in FIG. 3, an integrated circuit is provided that includes first memory 930 having a first read port and lines 931 and a first write port and lines 935 for concurrent read and write. Memory 930 has memory locations for data accessible, by asserting respective addresses on lines 932 and 936 to memory 930, through the first read port and the first write port. Second memory 940 has a second read port and lines 941 and a second write port and lines 945 for concurrent read R and write W. Memory 940 has memory locations for data accessible by asserting respective addresses on lines 942 and 946 to the memory 940 through the second read port and the second write port. Address generation circuitry in block 920 is respectively coupled by the address lines 932, 936, 942, 946 to the first memory 930 and to the second memory 940. The address generation circuitry is operable sequentially for encryption to generate address bits representative of at least one odd address and at least one even address concurrently. First memory 930 is responsive only to the even addresses, and the second memory 940 is responsive only to the odd addresses.

Figure 4:
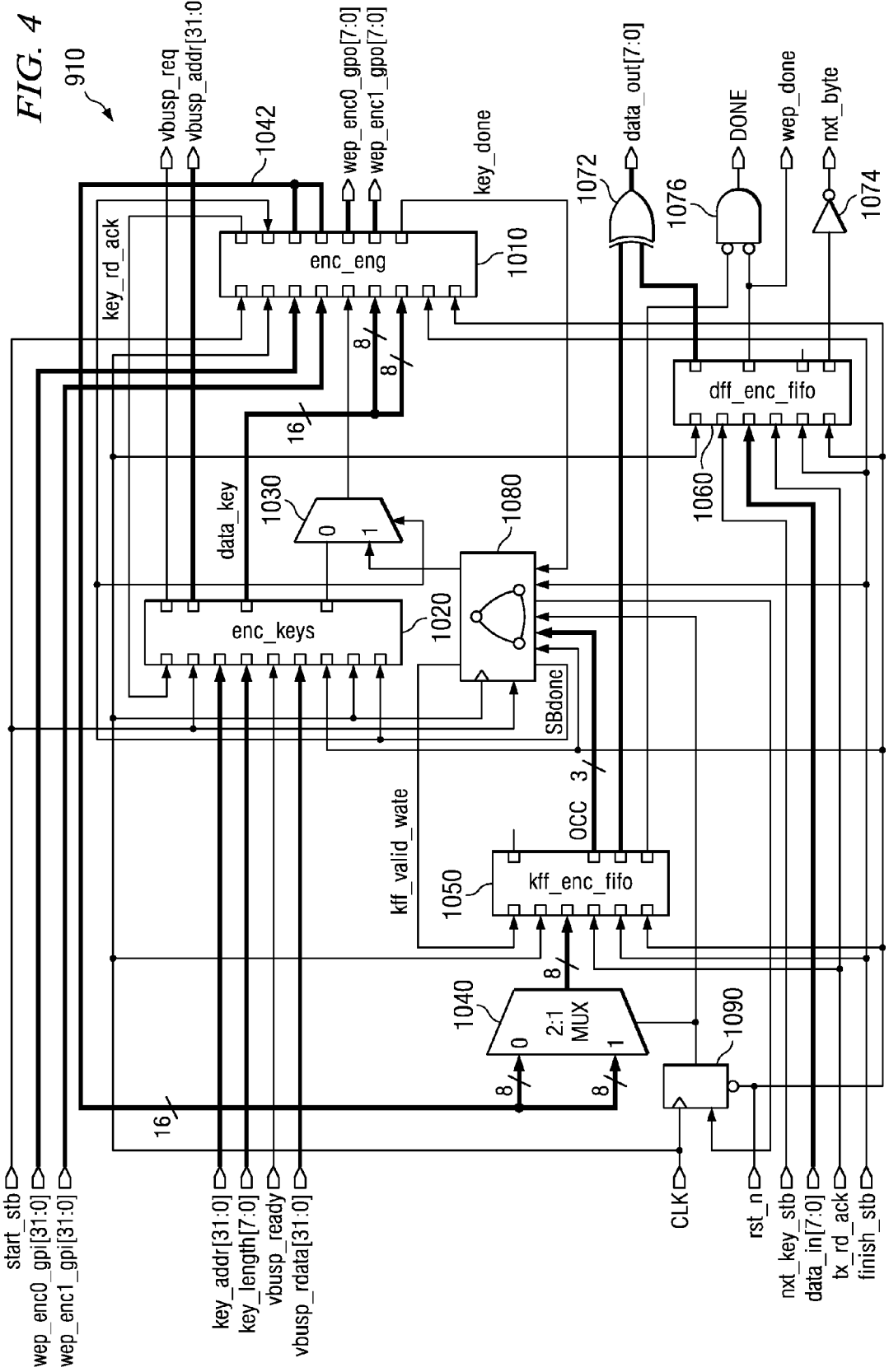
FIG. 4 is a more detailed schematic diagram of inventive circuitry in FIG. 3.

In FIG. 4, encryption circuit 910 has an encryption engine enc_eng 1010 coupled with a circuit enc_keys 1020. Encryption engine 1010 is responsible for basic SBox setup and encryption functionality using a state-machine based look ahead approach and dirty bit circuitry. Enc_keys circuit 1020 is responsible for fetching keys for the engine 1010 and handshake appropriately with the engine 1010.

Figure 5:
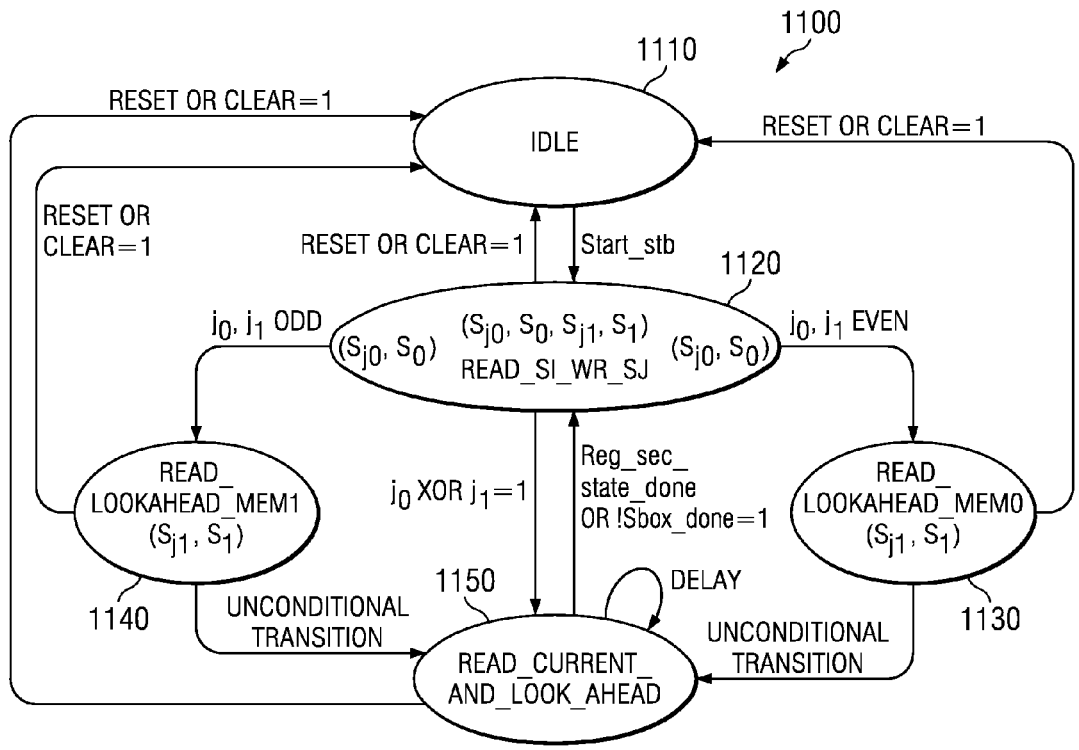
FIG. 5 is a state transition diagram of an inventive Primary State Machine embodiment and inventive process for the circuitry of FIG. 4.
Figure 6:
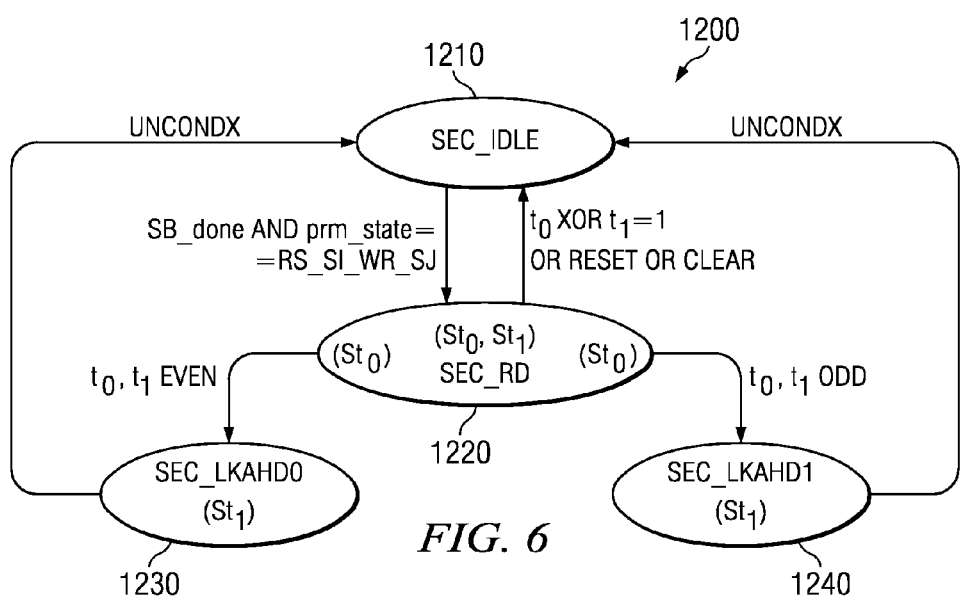
FIG. 6 is a state transition diagram of an inventive Secondary State Machine embodiment and inventive process for the inventive circuitry of FIG. 4.

Encryption engine 1010 includes two parallel state machines called a Primary State Machine 1100 of FIG. 5 and a Secondary State Machine 1200 of FIG. 6 for implementing the process tables discussed herein. The Primary state machine contains the Sbox setup and the dirty bit circuitry. Primary State Machine is also responsible for performing the tasks that are common to Sbox STEP1 and the encryption STEP2. Secondary state machine is an incremental state machine over the primary state machine. Secondary State Machine gets triggered when the Sbox setup is done and works with Primary State Machine in tandem to perform the extra steps in the encryption process.

Secondary state machine starts only after the primary state machine issues an Sbox done signal indicating to it that encryption phase has begun. After the Sbox done signal is issued, the Primary State Machine waits for the secondary state machine to complete the iteration step before it starts the computation for the next iteration. These state machines are described in further detail in connection with FIGS. 5 and 6.

Encryption Engine signal interfaces to Circuit 910 of FIGS. 3 and 4 are tabulated here.

TABLE

Encryption Engine Interface

| Signal | Dir | Description |
|---|---|---|
| clk | I | Clock |
| rst_n | I | Asynchronous active low reset |
| start_stb | I | Starts the operation of wep engine |
| nxt_key_stb | I | Valid input data indication available for encryption. |
| data_in[7:0] | I | Input data to be encrypted |
| next_byte | O | Indicating the interfacing logic that engine is ready to intake more raw data |
| finish_stb | I | Indicating end of the data stream. Stops the operation of WEP engine. (No more input data will be available. Engine is expected to continue holding out the last encrypted byte) |
| key_addr[31:0] | I | Address where wep key is present |
| key_length[7:0] | I | Length in bytes of wep key |
| data_out[7:0] | O | Encrypted data |
| done | O | Asserted when input data is encrypted (Can be on same cycle as data_in is presented) |
| tx_rd_ack | I | Acknowledge from external logic that the encrypted byte (data_out) in the output bus is read |
| Wep_done | O | Indicating all the bytes inputted to the engine have been processed |
| memory interface signals | | |
| vbusp_req | O | Request to memory |
| vbusp_addr[31:0] | O | Memory address |
| vbusp_rdata[31:0] | I | Read data from memory |
| vbusp_rready | I | Read ready |

Circuit 1020 generates Requests on line vbusp_req, and has address generators to generate addresses on 4-byte address bus vbusp_addr [31:0]. Circuit 1020 sends data to write ports of memories 930 and 940 along two byte-wide portions of data bus vbusp_rdata, and receives data from read ports of memories 930 and 940 along another two byte-wide portions of data bus vbusp_rdata. Circuit 1020 receives Ready acknowledgement from memory 920 on line vbusp_ready. Circuit 1020 is coupled via a 2-byte-wide bus data_key to encryption engine 1010 and thereby supplies Encryption engine 1010 data that has been read from memories 930 and 940. Encryption engine 1010 handshake-replies on a line key_rd_ack (Key read acknowledge) back to circuit 1020.

Further in FIG. 4, during encryption a multiplexer MUX 1030 feeds an enable or disable to encryption engine 1020 depending on a selection signal SBdone (SBox initialization complete) fed to the control input of the MUX 1030. When selection signal indicates SBox initialization is complete, a key-valid signal from circuit 1020 is supplied via MUX 1030 to encryption circuit 1010. Otherwise, when S-Box initialization is in progress but not complete or not in progress at all, MUX 1030 feeds a different control signal to encryption engine 1010.

During either S-Box setup STEP 1 or encryption processing by encryption engine 1010, a MUX 1040 is clocked alternately to receive first one output key-byte Sto or a second output key-byte St1 via a two-byte-wide bus 1042 from encryption engine 1010. The alternately-selected key-bytes are successively fed along the byte-wide output of MUX 1040 to a first encryption Key FIFO (first-in, first-out) circuit KFF 1050.

In the meantime, data on data bus data_in[7:0] is being fed to a second encryption data FIFO DFF 1060. The first and second encryption FIFOs KFF 1050 and DFF 1060 supply their respective byte-wide output successively to eight parallel Exclusive-OR circuits symbolized collectively as XOR 1072. This part of the encryption process produces encrypted/decrypted byte-wide data at the 8-wide data bus data_out.

During the encryption cycles, second encryption FIFO DFF 1060 provides a handshake output nxt_byte requesting next data byte from a data source (not shown). A handshake input tx_rd_ack provides a transmit read acknowledge pertaining to the data on data bus data_in to be encrypted/decrypted. When the encryption cycles are completed, a DONE signal is provided by an AND gate 1076 having low-active inputs coupled to the first and second encryption FIFOs KFF 1050 and DFF 1060.

The encryption engine enc_eng 1010 and MUX 1040 together form an example of execute circuitry herein, which has an output from MUX 1040. XOR 1072 is an example of a cryptological logic circuit. XOR 1072 is coupled by FIFO buffer KFF 1050 to the output of the execute circuitry. The execute circuitry is operable to supply at least some of the set of SBox data from the memory elements of memories 930 and 940 to the cryptological logic circuit. XOR 1072 has a first input coupled to the output of a second FIFO buffer DFF 1060 for supplying a data stream from FIFO 1060 input data_in[7:0] to the first input of XOR 1072. The cryptological logic circuit (e.g. XOR 1072) is responsive to the data stream and to the series of iterations by the execute circuitry to supply the data stream cryptologically altered as an output at data_out [7:0].

Further in FIG. 4, a control state machine circuit 1080 has three states and cycles through them in this order: IDLE, SBDONE (S-Box Done), and ENG_ACT (Encryption Engine Active). When S-Box setup is initiated by external control signal Start_Stb, operations in circuit 1080 transition from IDLE state to state SBDONE. When S-Box setup is completed, circuit 1080 transitions from SBDONE to ENG_ACT. When encryption of the data is completed, circuit 1080 transitions from ENG_ACT to IDLE. If control signal Finish_Stb goes active during the state ENG_ACT, operations transition from ENG_ACT to IDLE.

Control state machine circuit 1080 supplies a first output SBDONE to the selection control of MUX 1030 and a second output to an input of MUX 1030 to signal encryption engine 1010 to perform the operations specific to encryption instead of the S-Box setup. Output SBDONE also goes to encryption keys circuit 1020 to signal it that key K[i] is not needed in encryption iterations. These operations include preventing the two bytes of data key on the 2-byte-wide bus data_key from being utilized directly in the computation of address j in the encryption STEP2, but explicitly utilizing the on-coming two bytes of data key on the 2-byte-wide bus data_key in the S-Box setup STEP1 in the computation of address j. In S-Box setup STEP1, however, the encryption circuit 1010 responds to MUX 1030 to inhibit operation of the Secondary State Machine of FIG. 6 so as not to produce output key-bytes St0 and St1. The encryption circuit 1010 responds to MUX 1030 to produce output key-bytes St0 and St1 only in encryption STEP2 by operation of the Secondary State Machine of FIG. 6.

Encryption engine supplies a key_done signal to Control State Machine circuit 1080. Key FIFO 1050 handshakes with Control state machine circuit 1080 by supplying a 3-wide Occupied (occ) signal representing when key FIFO 1050 has all latest 8 data bits loaded from MUX 1040. Then control state machine circuit 1080 supplies an acknowledge signal kff_valid_write to key FIFO 1050.

A clock source CLK is connected to clock the encryption engine 1010, the encryption keys circuit 1020, the first and second encryption FIFOs KFF 1050 and DFF 1060, and control state machine 1080. A clock buffer 1090 couples clock CLK to the selection control input of MUX 1040 and to an input of control state machine 1080. An inhibit output of control state machine 1080 selectively controls the clocking selection input of MUX 1040.

A low-active reset signal on line rst_n is connected to and resets the encryption engine 1010, the encryption keys circuit 1020, the first and second encryption FIFOs KFF 1050 and DFF 1060, and control state machine 1080. Reset also drives a low-active inhibit input of clock buffer 1090.

A pair of 32-bit input busses wep_enc0_gpi and wep_enc1_gpi are connected to Encryption engine 1010. A pair of 8-bit output busses wep_enc0_gpo and wep_enc1_gpo are connected to and driven by Encryption engine 1010. These two pairs of busses pertain to built-in self-test (BIST) and need no further discussion herein for purposes of the embodiments.

State Machines

In FIG. 4, control state machine 1080 provides control signals to initiate the S-Box setup (RC4 STEP 1 hereinabove), and then provides control signals to initiate the encryption (RC4 STEP 2 hereinabove).

Execution State Machines

Two parallel state machines called the Primary State Machine 1100 and the Secondary State Machine 1200 are used to further implement the above embodiment. An external agent on chip (e.g. embedded CPU 860 of FIG. 2G activates start_stb) or in the system initiates or fires commencement of the operations of the Primary State Machine 1100, which in turn initiates operation of the Secondary State Machine 1200.

Secondary State Machine 1200 is an incremental state machine over the Primary State Machine 1100. Secondary State Machine 1200 gets triggered when the Sbox setup is done and works with Primary State Machine 1100 in tandem to perform the extra steps in the encryption process as compared with the Sbox setup process.

In FIG. 5, Primary State Machine 1100 contains the special Sbox setup implementing dirty bit scheme. This state machine is also responsible for performing the tasks that are common to the Sbox setup step and the encryption step. Encryption of bytes is then initiated when the Sbox setup is done and Sbox_done signal has been generated. The dirty bit state is also part of the logic of encryption reads from memory 920. When necessary, Primary State Machine 1100 waits for the Secondary State Machine 1200 to complete an iteration before Primary State Machine starts the computation for the next iteration. When an Encryption Done enc_done signal is generated according to the last byte of data encrypted, Primary State Machine 1100 goes back to the initial state where it again resets the dirty bit state and then moves to the Idle state and waits to be fired by an external agent in the system.

In FIG. 6, Secondary State Machine 1200 is in a SEC_IDLE state until Primary State Machine 1100 generates, or issues, a signal Sbox_done indicating that Sbox setup is done. Signal Sbox_done is coupled to and received by Secondary State Machine 1200. Sbox_done signal indicates to Secondary State Machine 1200 that encryption phase has begun. Secondary State Machine 1200 then invokes a parallel thread of accessing the memory 930, 940 depending on the current and the next byte accesses required ($t_i$ and $t_{i+1}$). Secondary State Machine 1200 is responsible for invoking the parallel thread of operation for throughput enhancement.

In the embodiment of FIG. 5 the Primary State Machine 1100 executes the operations which the S-Box setup and the encryption have in common. This state machine 1100 is defined by four (4) case statements for the Cases, and four (4) case statements for the Subcases, so that the operations of the sixteen (16=4 Cases×4 Subcases) tables result. If-else structures in state machine 1100 are provided to establish the parts pertaining to S-Box setup, and the further parts pertaining to encryption. Note that the S-Box setup tables for Cases (1) and (4) utilize one more clock cycle (have one more row each) than the S-Box setup tables for each of Cases (2) and (3). Accordingly, an additional pair of states in Primary State Machine 1100 are provided for Cases (1) and (4) respectively to realize operations in the additional clock cycle.

In the embodiment of FIG. 6, the Secondary State Machine 1200 executes the operations in the encryption process that involve reading S-Box key bytes $S_{t0}$ and $S_{t1}$. These operations are not present in the S-Box setup. Notice that in the eight (8) tables for Subcases (a) and (d), the operations to read S-Box key bytes $S_{t0}$ and $S_{t1}$ occupy two clock cycles (2 rows) compared to the single clock cycle read of both S-Box key bytes $S_{t0}$ and $S_{t1}$ in each of the eight (8) tables for Subcases (b) and (c). Accordingly, an additional pair of states are provided in Secondary State Machine 1200 for Subcases (a) and (d) respectively to realize operations in the additional clock cycle. Here again, case statements and if-else structures are then used to define the variations among the tables as shown for the Cases and Subcases.

RTL (Register Transfer Language) design tools currently available allow for high level design code to represent not only the operations but also the structures of an integrated circuit. Conventionally, the design code is automatically processed to produce the netlist of the gates of the integrated circuit. From the netlist a place-and-route program defines the geometric layout of the transistors and interconnecting conductive upper layers of the integrated circuit. The layout is used to establish the information needed by the wafer fabrication operation to actually manufacture the integrated circuit.

The operations and high level structures are described herein at a design level used by the person skilled in the art to thereupon implement the integrated circuit by preparing the RTL design code and proceeding to manufacture.

In FIG. 5 operations of Primary State Machine 1100 begin in an IDLE state 1110 or go to IDLE when a RESET or CLEAR signal is active regardless of previous state. In the IDLE state initialization operations occur and the very first read of $S_0$ and $S_1$ occurs.

Next a start signal Start_stb causes a transition from IDLE state to a state 1120 designated READ_SI_WR_SJ. This state 1120 suitably is defined in design code in terms of a case statement that has cases corresponding to the Cases 1, 2, 3, 4 of the Tables. In cases 2 and 3 the reads and writes are instantiated as respectively symbolized by table rows [$S_{j0}$, $S_0$, $S_{j1}$, $S_1$] and [$S_{j1}$, $S_1$, $S_{j0}$, $S_0$] for those cases 2 and 3 regardless of subcase. Thereupon, operations transition to a state 1150 as indicated by the transition legend identifying Cases 2 and 3 as the ones where the Exclusive-OR of address $j_{i=0}$ and address $j_{i=1}$ is one (1). In other words these cases are the ones where the two addresses are different in even/oddness.

In state 1120, operations of Cases 1 and 4 do not do all four RWRW operations at once. Instead, Case 1 in state 1120 first performs Read Write into Memory 0 of [$S_{j0}$, $S_0$] followed by a transition to a state 1130 to perform Read Write [$S_{j1}$, $S_1$] into Memory 0 on the next clock cycle which is the cycle in which state 1130 operates. Alternatively in Case 4 of state 1120, state 1120 first performs Read Write into Memory 1 of [$S_{j0}$, $S_0$] followed by a transition to a state 1140 to perform Read Write [$S_{j1}$, $S_1$] into Memory 1 on the next clock cycle which is the cycle in which state 1140 operates. After either of states 1130 and 1140, operations transition to state 1150.

State 1150 is designated READ_CURRENT_AND_LOOK_AHEAD. This state 1150 is allowed to execute the first clock cycle of a new iteration provided the S-Box setup is not done (!Sbox_done=1) or encryption is going on and the Secondary State Machine is done. Execution of state 1150 is delayed or temporarily prevented by logic if the Secondary State Machine 1200 is still executing its contribution to an encryption iteration. (Reg_sec_state_done not active). This delay is symbolized by the arrow DELAY on the oval for state 1150. When Reg_sec_state_done goes active, the state 1150 proceeds to execute the first cycle of the next iteration. State 1150 executes the operations of the first clock cycle of the next iteration by executing the RWRW operations symbolized by [$S_2$, $S_{j0}$, $S_3$, $S_{j1}$]. Upon completion of state 1150 execution, operations transition to state 1120 READ_SI_WR_SJ and proceed through the next iteration. Finally, the last iteration is reached and completed.

In FIG. 6, operations of Secondary State Machine 1200 initialize and begin in a SEC_IDLE state 1210. SEC_IDLE state 1210 monitors the Primary State Machine 1100 to determine when operations are now in the encryption phase and the particular cycle wherein state READ_SI_WR_SJ becomes active in an iteration. This condition is represented by the legend SB_done AND prm_state=READ_SI_WR_SJ. Operations in Secondary State Machine 1200 now transition from SEC_IDLE state 1210 to a state 1220 SEC_RD.

SEC-RD state 1220 suitably is defined in design code in terms of a case statement that has cases corresponding to the SubCases (a), (b), (c), (d) of the Tables. In the two Subcases (b) and (c) the encryption-key byte-reads are instantiated in one clock cycle as respectively symbolized by table rows [$S_{r0}$, --, $S_{r1}$, --] and [$S_{r1}$, --, $S_{r0}$, --] for those Subcases (b) and (c) regardless of Case 1, 2, 3, 4. Thereupon in those two Subcases (b) and (c), operations transition back to SEC_IDLE state 1210 as indicated by the transition legend (to XOR $t_i$=1) OR RESET OR CLEAR. Subcases (b) and (c) are thus identified as the ones where the Exclusive-OR of address $t_{i=0}$ and address $t_{i=1}$ is one (1). In other words these Subcases (b) and (c) are the ones where the two addresses $t_0$ and $t_1$ are different in even/oddness.

Further in FIG. 6, in state 1220, operations of Subcases (a) and (d) do not do both key-byte read operations at once. Instead, Subcase (a) in state 1220 first performs a single Read from Memory 0 of [$S_{r0}$, --, --, --] followed by a transition to a state 1230 SEC_LKAHD0 to perform Read [$S_{r1}$, --, --, --] from Memory 0 on the next clock cycle which is the cycle in which state 1230 operates. Alternatively, Subcase (d) in state 1220 first performs a single Read from Memory 1 of [--, --, $S_{r0}$, --] followed by a transition to a state 1240 SEC_LKAHD1 to perform a Read [--, --, $S_{r1}$, --] from Memory 1 on the next clock cycle which is the cycle in which state 1240 operates. After either of states 1230 and 1240, the secondary state machine done condition is set (Reg_sec_state_done=1) and operations transition back to state 1210 SEC_IDLE.

Notice that the signal prm_state=READ_SI_WR_SJ from the Primary State Machine 1100 coordinates the operation of Secondary State Machine 1200 with the operations of Primary State Machine 1100 so that the encryption key byte read process in Secondary State Machine 1200 begins on the correct clock cycle as tabulated. Thus, both state machines 1100 and 1200 are sometimes operative simultaneously, and other times one state machine is waiting for a signal to resume operating, with the signal coming from the other state machine. Moreover, the signal Reg_sec_state_done from the Secondary State Machine 1200 coordinates the operation of Primary State Machine 1100 with the operations of Secondary State Machine 1200 so that the next iteration begins no sooner than the correct clock cycle as tabulated.

Figure 7:
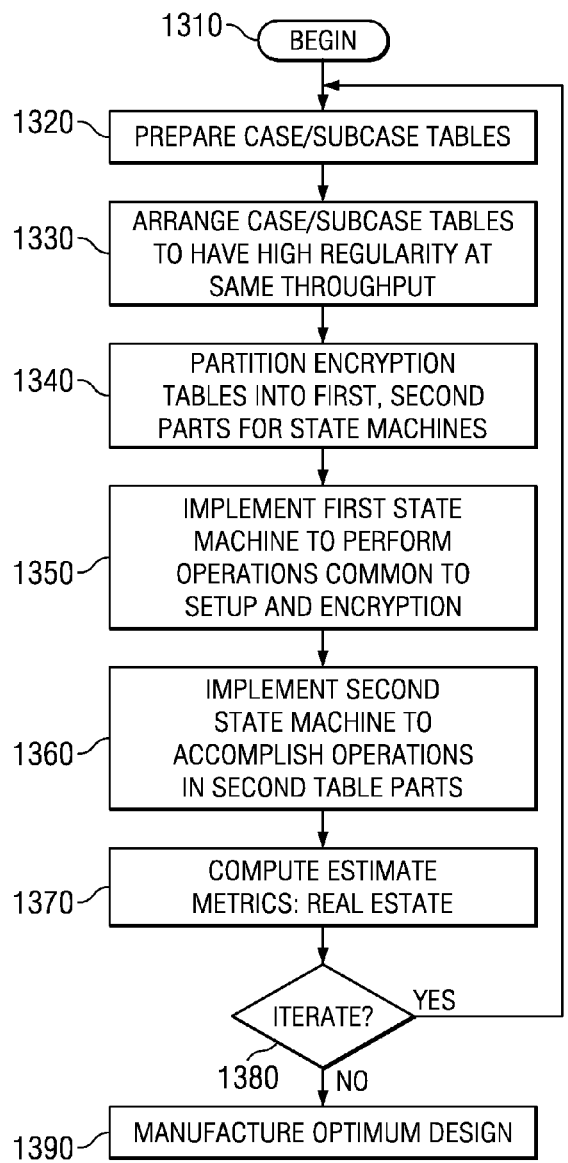
FIG. 7 is a flow diagram of an inventive method of manufacturing integrated circuits including the inventive circuitry of FIGS. 3, 4, 5, and 6.

In FIG. 7, a remarkably real-estate efficient group of embodiments use not one but at least two execution state machines to implement the Case/SubCase tables. These advantageous embodiments are achieved by the following design process.

Operations commence at BEGIN 1310. Then in a step 1320, prepare the Case/SubCase tables for all steps of the setup and encryption process. In the case of RC4 encryption with two 2-port memories, this means preparing the four (4) S-Box setup tables and sixteen (16) encryption tables. The number of tables varies with the number of memories and number of ports as later discussed hereinbelow.

Next, in a step 1330, arrange the Case/SubCase tables to have a high degree of regularity. Advantageously hereinabove, the second group of sixteen Case/SubCase encryption tables have a higher degree of regularity. The same encryption throughput is achieved compared to the first group of sixteen Case/SubCase encryption tables because no additional clock cycle rows are needed.

Further in FIG. 7, a step 1340 partitions the sixteen Case/SubCase encryption tables having high regularity into at least a first part associated with at least a first state machine, and at least a second part associated with at least a second state machine. Succeeding step 1350 implements and arranges the first state machine to perform the first-part operations that the S-Box setup tables have in common with the sixteen Case/SubCase tables. The next step 1360 implements and arranges the second state machine to accomplish the operations established in the second part.

Further step 1370 estimates (or utilizes a design tool to compute) the number of gates, number of transistors, and/or integrated circuit real-estate required to implement the encryption. Decision step 1380 determines if the tables indicate a variety of ways to achieve regularity, and if so, the design process is iterated or repeated to determine whether even more efficient designs exist. If the iterations are complete, or no iterations are needed, operations reach a step 1390.

In step 1390 the optimum design is chosen according to considerations of setup time, throughput, and cost. Cost is related to, and generally increases with, design complexity, gate count, transistor count, and actual area real-estate occupied by the solution. Upon choosing the optimum design, the optimum design is manufactured in a wafer fabrication and assembly/test operational sequence so that a working integrated circuit in an integrated circuit package is the result.

Figure 8A:
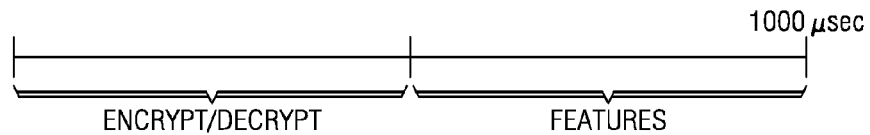
FIGS. 8A and 8B are time interval diagrams for illustrating improved real time operations in the inventive blocks and inventive system of FIG. 1.

In FIG. 8A, a real-time system has an illustrative 1000 microsecond (usec) time period in which to accomplish a unit of operations implementing not only encryption/decryption but also a panoply of features expected by users of the real-time system. Where the improvements are not implemented, the encryption/decryption occupies a lengthy substantial portion of the 1000 usec time period according to unimproved implementation of operations of S-Box setup STEP 1 and encryption STEP 2.

Figure 8B:
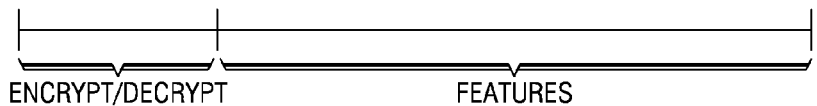

In FIG. 8B, by contrast, improved implementation of operations of S-Box setup STEP 1 and encryption STEP 2 considerably shorten the encryption/decryption real-time operations and reduce the overhead that would otherwise burden the real-time system due to these operations. Advantageously, the time remaining is suitably used to improve the operation of other important features of the real-time system, and to add additional important features to the real-time system, thereby benefiting customer users. Alternatively or additionally, the processor is replaced with a less-expensive lower-performance processor (or not replaced with a more expensive higher-performance processor as more features are demanded), so that the real-time system is made more economical.

Figure 9:
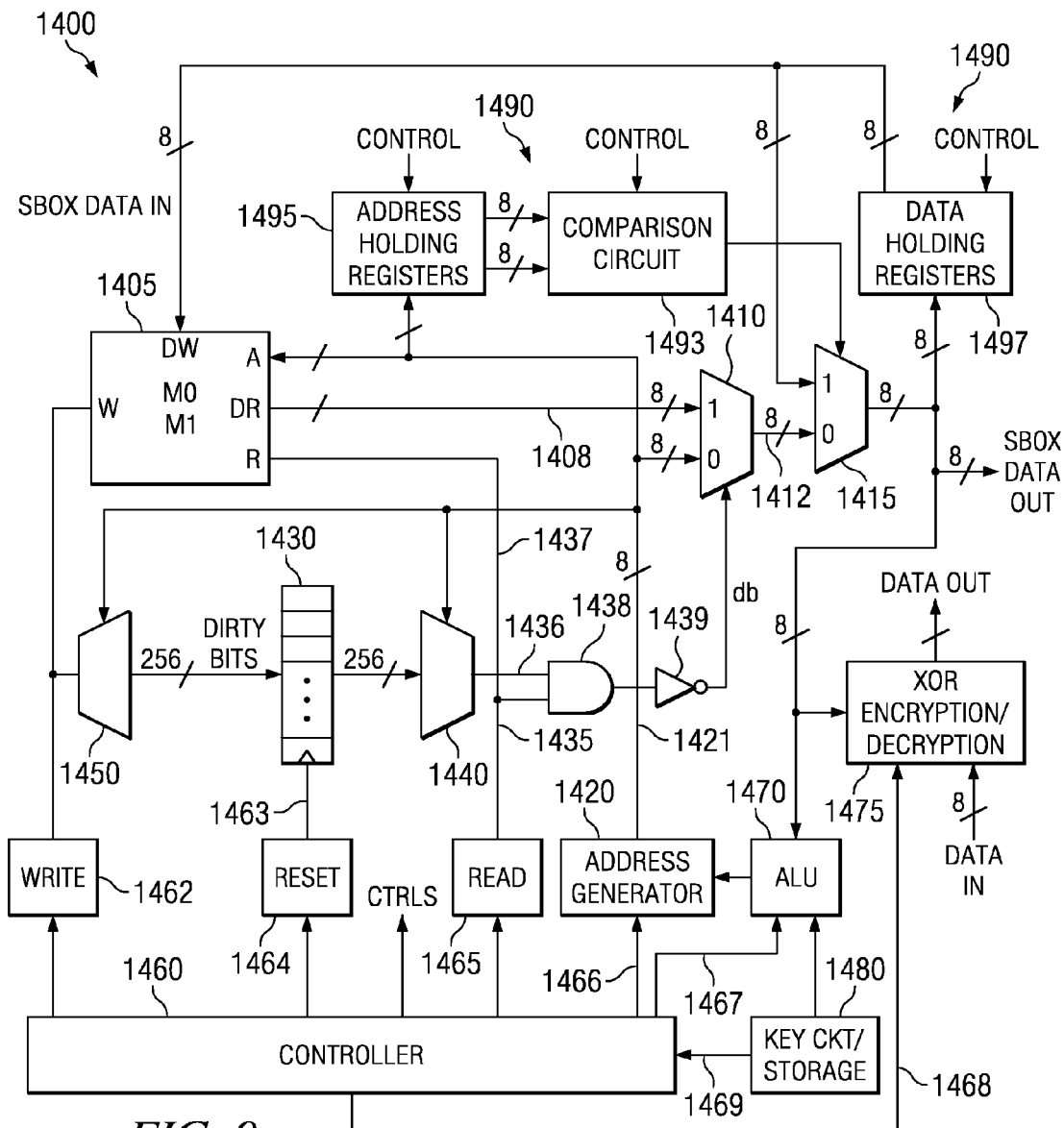
FIG. 9 is a partially schematic, partially block diagram emphasizing parts of an implementation of the inventive circuitry of FIG. 3.

In FIG. 9 a circuit 1400 utilizes the advantageous dirty-bit control of data in a 256-byte S-Box memory 1405. (The number of RW ports and any segregating of the memory are deemphasized in the drawing in order to emphasize the dirty bit and dependency look ahead improvements.) A dirty-bit (db) controlled multiplexer (MUX) 1410 selects either the read data byte from output DR of memory 1405 via data line 1408, or the address from an address generator 1420 on byte-wide line 1421, which address is asserted to the memory 1405 at address input A. A dependency-resolution MUX 1415 selects either the output of MUX 1410 or data from a holding register as described later hereinbelow. The output of MUX 1415 is regarded as the S-Box Data Out output.

In the dirty bit control portion of the circuitry 1400, a dirty bit register 1430 has 256 bi-stable storage elements for holding 256 dirty bits respectively. A read line 1435 when high active, enables a DATA VALID line 1437 and the read input R of the Memory 1405. NAND gate 1438 coupled at its output via an inverter 1439 to the control input of MUX 1410. A MUX 1440 couples a dirty bit selected from dirty bit register 1430 to a second input of NAND gate 1438. The dirty bit selected is determined by the 8-bit address coupled from address generator 1420 to an 8-wide selection control input of MUX 1440. When dirty bit register 1430 has the dirty bit corresponding to that address set, the dirty bit signifies that the byte at the corresponding address in S-Box memory 1405 has been previously written with data. If the dirty bit is not set, the byte at the corresponding address in S-Box memory 1405 has not been previously written with data and the address itself will be used as if it were the S-Box data byte to be read.

When the NAND gate 1438 has a dirty bit set (1) provided to its second input, the output of NAND gate 1438 goes low and the output of inverter 1439 goes high, causing MUX 1410 to select the data output DR from memory 1405 and pass that data to the MUX 1415. When the dirty bit is not set (0), then the output of address generator 1420 is selected by MUX 1410 and passed to the MUX 1415.

Further in FIG. 9, a controller 1460 controls the operations the rest of the circuitry, including a write circuit 1462, a reset circuit 1464, a read circuit 1465, address generator 1420 via a control line 1466, an arithmetic logic unit (ALU) 1470 via a control line 1467, an Exclusive-OR (XOR) encryption/decryption circuit 1475 via a control line 1468. A Key circuit and storage block 1480 activates controller 1460 via an enable line 1469 when a key is present. The Key S[k] is provided to ALU 1470 for use in the S-Box setup computations described earlier hereinabove. MUX 1415 also has its output SBOX DATA OUT connected to ALU 1470 so that ALU 1470 can utilize and process Si and Sj data in the setup and encryption operations as described elsewhere herein. The ALU 1470 supplies each computed address to address generator 1420 for accessing the S-Box memory 1405.

The S-Box memory 1405 is updated with data on an 8-wide SBOX DATA IN data bus to memory 1405. The S-Box memory 1405 is write-controlled by write circuit 1462 sending a signal connected to the write (W) input of S-Box memory 1405, and to the input of a 1:256 demultiplexer (DMUX) 1450. Address generator 1420 supplies an 8-bit address to an 8-wide selection control input of DMUX 1450. 256 outputs of DMUX 1450 are respectively connected to the 256 dirty bit elements of dirty bit register 1430. The write signal from Write circuit 1462 is coupled by DMUX 1450 to the selected one of the 256 outputs of DMUX 1450 and thereupon sets the corresponding dirty bit element to one (1) at dirty bit register 1430.

The dirty-bit circuitry is thus used with memory or storage having memory locations 1405 for data and dirty bits 1430 accessible at addresses in the memory. An address line 1421 (from Address generator 1420) carries address bits. A data line 1408 carries data bits. Dirty bit line 1436 conveys a dirty bit set/reset state (from MUX 1440). Control line 1435 carries a read signal (from Read circuit 1465). Selector circuit 1410 has a selector output 1412 selectively coupled to the address line 1421 and to the data line 1408. A selector control input is connected via a dirty bit control line db to the output of inverter 1439. Read line 1435 is coupled to the selector circuit via NAND-gate 1438 and inverter 1439. The selector circuit MUX 1410 is responsive to a read signal on the read line 1435 and to a reset state on the dirty bit line 1436 to couple the address line 1421 to the selector output 1412.

In FIG. 9, Reset circuit 1464 operates at S-Box initialization time to simultaneously reset all 256 dirty bit elements of dirty bit register 1430 via reset line 1463. In this way, a single-cycle S-Box initialization is realized. Thereupon, S-Box setup operations proceed as elsewhere described herein.

Encryption is performed by XOR-ing unencrypted bytes from an input DATA IN of the XOR Encryption/Decryption circuit 1475. A latest unencrypted byte is XOR-ed with the latest byte SBOX DATA OUT from MUX 1415. The result of the XOR is supplied as an encrypted byte at an output DATA OUT from block 1475.

Decryption is performed by XOR-ing encrypted bytes from input DATA IN of the XOR Encryption/Decryption circuit 1475. A latest encrypted byte is XOR-ed with the latest byte SBOX DATA OUT from MUX 1415. The result of the XOR is supplied as a decrypted byte at an output DATA OUT from block 1475.

In design code, the dirty bit control of the read is suitably established by if-then structures. For example:

```
if(db) Sj = M0_rd_data
else   Sj = j;
``` where db means a selected dirty bit value of zero or one, and M0_rd_data is an example of data read from memory M0 of FIG. 3. The memory read that is expressed after "if (db)" is read-executed when dirty bit db is (1). The "else Sj=j" line is executed when dirty bit db is zero (0). This "else Sj=j" line interprets the address as a read value where the memory has not been written at that address and thus dirty bit db is zero (0), as illustrated in FIG. 9.

Dependency Resolution: Where results like Sj1 or St1 relating to next byte i+1 may be dependent on results for byte i before a write of Sjo, the dependency is suitably resolved by an appropriate logic structure in the design code such as illustrated by:

```
If(i = j(i+1))
    Sj1 = Sjo;
    else if(db) Sj1 = M1_rd_data
        else    Sj1 = j(i+1);
```

This example handles the situation where Sj1 is to be read after Sjo is read but before Sjo is swap-written. Again db means a selected dirty bit value of zero or one, and M1_rd_data is an example of data read from memory M1 of FIG. 3 in a case or subcase calling from a read from that particular memory M1 (otherwise enter "M0"). The last "else" line interprets the address as a read value where the memory has not been written at that address and thus dirty bit db is zero (0), as illustrated in FIG. 9.

Correspondingly in FIG. 9, a dependency circuit 1490 includes the dependency-resolution MUX 1415, a comparison circuit 1493, address holding registers 1495, and data holding registers 1497. Controller 1460 provides control signals collectively designated group CTRL. At least one of these controls enables the comparison circuit 1493 and/or drives the zero (0) selection from comparison circuit 1493 to MUX 1415 when no dependency is involved so that S-Box output is directly from MUX 1410. Another control signal in the group CTRL is fed to address-holding registers 1495 and enables storage into and output from a selected pair of registers, such as for instance, one register for first byte address i and one register for address j (i+1), where address j is a function of the second byte address i+1. Comparison circuit 1493 compares the selected ith address i and the selected address j(i+1). If the addresses are not equal, then there is no dependency, and comparison circuit 1493 provides a control signal zero (0) to the control input of MUX 1415. In response to the control signal zero, the MUX 1415 couples a byte of read data from MUX 1410 to S-Box Data Out.

If the addresses are equal at comparison circuit 1493, then a dependency exists. Comparison circuit 1493 provides a control signal one (1) to the control input of MUX 1415. In response to the control signal one (1), the MUX 1415 couples a byte of held data (e.g. byte Sjo) from a selected holding register in registers 1497 to S-Box Data Out.

Further in FIG. 9 in an example of circuitry (using parentheses to illustrate particular data), the dependency circuitry has memory 1405 with memory locations for data accessible by asserting respective addresses to memory 1405, a first register (e.g., for Sjo in holding registers 1497), and a second register (e.g., for Sj1 in holding registers 1497). Read circuitry 1465 is operable to read to the first register a first datum (Sjo) stored at a location in the memory represented by a first address (jo). Address circuitry 1420, 1495 is operable to generate a second address (i) at which the first datum (Sjo) will be stored in memory 1405 and a third address (j1) at which a second datum (Sj1) can be read from memory 1405. Comparison circuitry 1493 responds to address circuitry 1420, 1495 when the third address (j1) is different from the second address (i) to read the second datum (Sj1) to second register (Sj1) from the third address (t1) in memory 1405. When the third address (j1) is the same as the second address (i) then comparison circuitry 1493 causes MUX 1415 to copy the first datum (Sjo) to the second register as the second datum (Sj1).

Write circuit 1462 acts as a storing circuit to store the first datum (Sjo) at the second address (i) after the reading or storing of the second datum (Sj1) to the second register (for Sj1) by the comparison circuitry 1493. Comparison circuitry 1493 suitably has multiple concurrently-operative comparators and cascaded selector MUXes for multiple byte operations appropriate to all dependencies identified in the application. Control circuitry 1460 is coupled to the comparison circuitry 1493 to perform the above operations plural times concurrently on plural bytes in an iteration of overlapping dependent calculations. Advantageously, the throughput is dramatically multiplied because dependencies in threads for one or more bytes (i+1) on calculations in a THREAD0 for a given byte (i) are inventively resolved in those concurrent threads THREAD1, and even higher threads 2, and 3, etc.

Figure 10:
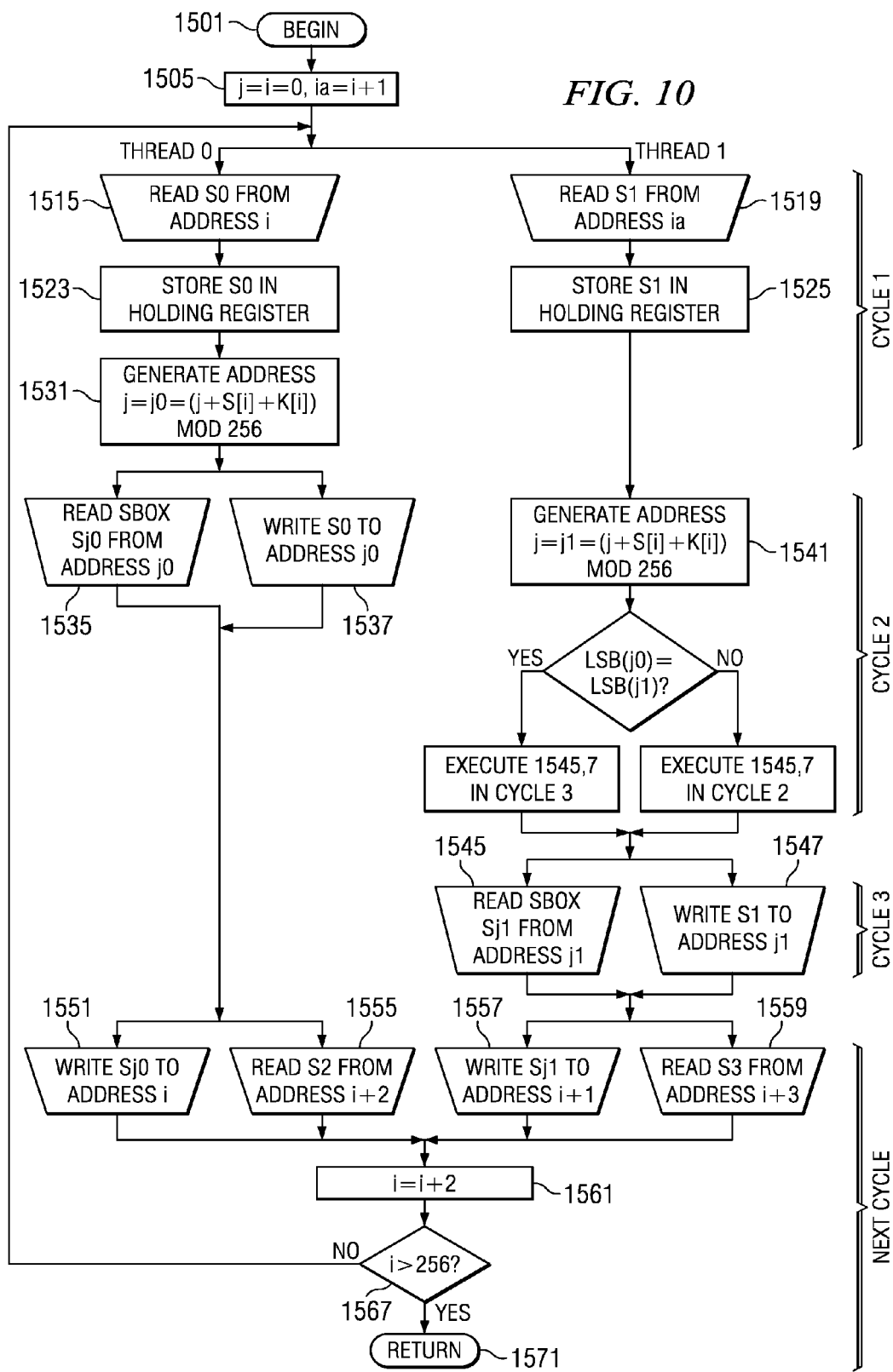
FIG. 10 is a flow diagram of improved operations in an inventive S-Box setup process.

In FIG. 10, a process of execution of an S-Box Setup shuffle in a two 2-port memory embodiment commences at a BEGIN 1501. It is emphasized that FIG. 10 especially pertains to the STEP 1 S-Box Shuffling portrayed in the four TABLE representation earlier hereinabove. Comparing the flow diagram of FIG. 10 with each of the TABLEs for Cases 1, 2, 3, 4 of the S-Box setup facilitates understanding of those tables and the process whether implemented in hardware, firmware or software. Operations proceed in a step 1505 to initialize an index i to zero, initialize an incremented index i (designated "ia") to one, and initialize an index j to zero. Next, two threads (concurrent operations) THREAD 0 and THREAD 1 start. In THREAD 0 a step 1515 reads S(i) from address i (S0 from address 0 of Memory M0 for example). Next a step 1523 stores S(i) in a holding register. In THREAD 1 a step 1519 reads S(ia) from address ia (S1 from address 1 of memory M1 for example). Next a step 1525 stores S(ia) in another holding register. These operations 1515, 1519, 1523, 1525 are performed in a first clock cycle 1. THREAD 0 step 1531 generates an address j0 in fast logic updating j=j0 according to an S-Box setup formula.

Now in clock cycle 2, THREAD 0 step 1535 reads S-Box value Sj0 from address j0 earlier obtained in step 1531. A step 1537 in THREAD0 writes value S0 from step 1515 into address j0 (e.g. in the last half of the clock cycle) without conflict with read step 1535. The memory M0 (or M1) to be written is identified by the least significant bit of address j0. Meanwhile THREAD 1 step 1541 has the updated value of j from step 1531 and applies that updated value of j in generating an address j1 in fast logic further updating j=j1 according to the S-Box set up formula for index j.

The least significant bits of address j0 and j1 are compared. If address j1 has its least significant bit (LSB) different from the address j0 least significant bit, then the steps of the next paragraph are executed immediately in clock cycle 2. If address j1 has its least significant bit equal to the address j0 least significant bit, then the steps of the next paragraph are deferred to the next clock cycle 3 since they would contend for the same memory.

THREAD 1 steps 1545 and 1547 concurrently operate. In step 1545, S-Box value Sj1 is read from address j1 in Memory 0 (assuming Case 1, for example). If a dependency issue is present in step 1545 since datum Sj0 has not yet been written, the issue is resolved in step 1545 as described in connection with FIGS. 9 and 12 regarding dependencies. Step 1547 writes value S1 to address j1 in Memory 0 without conflict with step 1545. As noted in the previous paragraph, these steps are executed in cycle 3 or cycle 2 depending on whether the address j0 LSB=j1 LSB or not, respectively (i.e. whether the least significant bit (LSB) of address j0 equals the least significant bit of address j1 or not). Compare steps 1545, 1547 of FIG. 10 specifically to entries Sj1, S1 in cycle 3 of the two TABLEs for Case 1 and Case 4 of S-Box Shuffling earlier hereinabove and to the same entries Sj1, S1 in cycle 2 of the two TABLEs for Case 2 and Case 3 of S-Box Shuffling.

Proceeding in FIG. 10 to the next clock cycle NEXT CYCLE (4 or 3 see just above), THREAD 0 step 1551 writes datum Sjo to address i (e.g. i=0) in Memory M0. Step 1555 also reads S-Box value S2 from address i+2 (e.g. 2) of Memory M0 without conflict with step 1551. In the same cycle THREAD 1 Step 1557 writes datum Sj1 to address i+1 (e.g. 1) in memory M1. Step 1559 reads S3 from address i+3 (e.g. 3) in memory M1 without conflict with step 1557. Further in this clock cycle, index i is incremented by two (2) in step 1561. Decision step 1567 compares the new value of index i with 256, and if not greater, operations loop back to repeat THREAD 0 AND THREAD 1 based on the new value of index i. If greater in step 1567, then operations are completed, and RETURN 1571 is reached.

Figure 11:
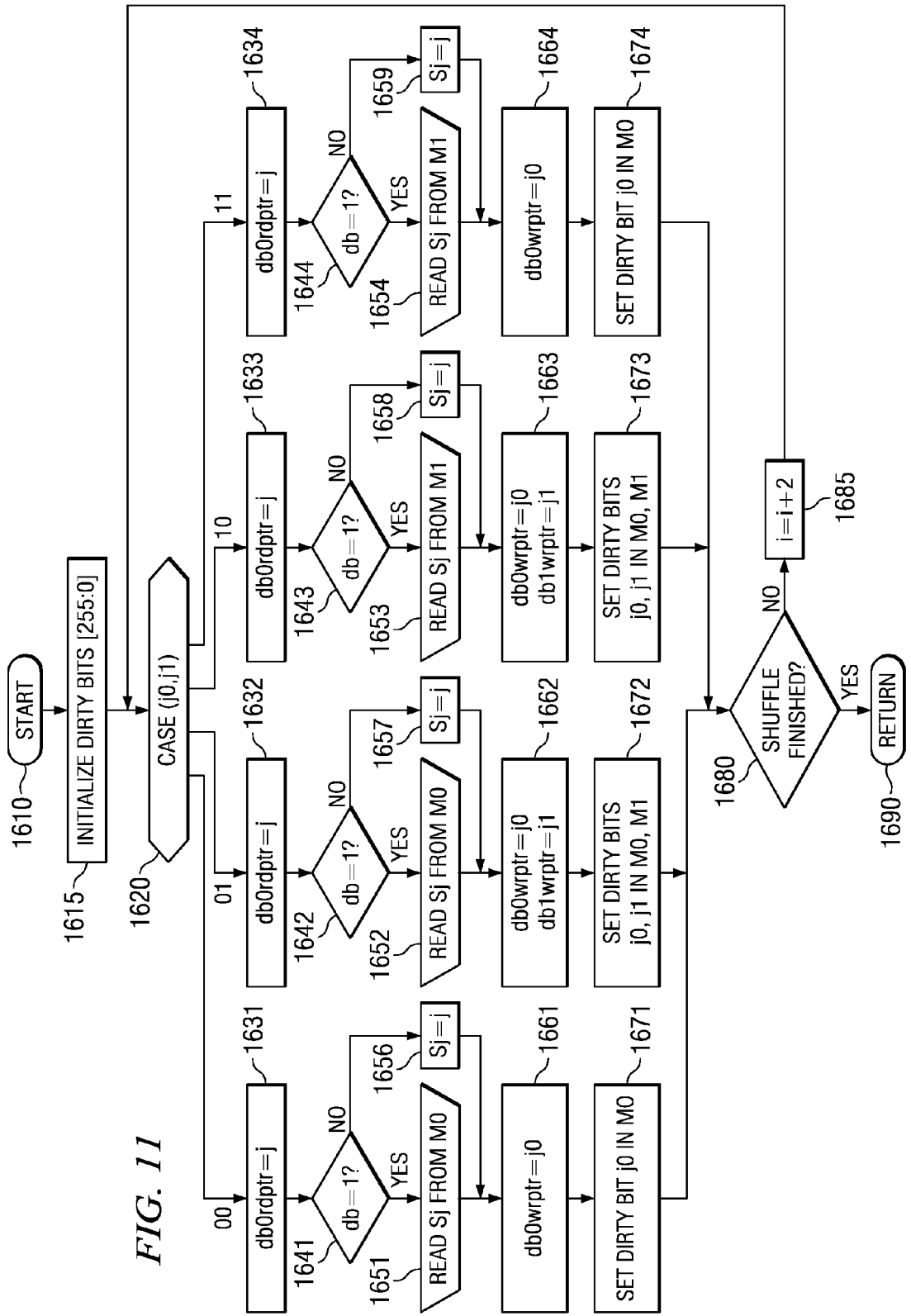
FIG. 11 is a flow diagram of improvements for dirty bit operations and other operations in an S-Box setup process of the invention.

In FIG. 11, a process of dirty bit control found in the FIG. 5 state 1120 READ_SI_WR_SJ is depicted in a case-based flow diagram. Comparing the flow diagram of FIG. 11 with the S-Box setup TABLEs hereinabove and with the state transition diagram of FIG. 5 facilitates understanding of inventive apparatus aspects and inventive process aspects whether implemented in hardware, firmware or software.

In FIG. 11, operations commence with a START 1610 and proceed to a step 1615 initializing all the dirty bits [255:0] simultaneously. Next a step 1620 handles the respective four cases (j0, j1) as represented by a CASE statement. The respective branches 00, 01, 10, 11 for the four cases are labeled beneath the CASE statement and above alternative columns of steps corresponding to the branches.

In FIG. 11, operations 1631, 1632, 1633, 1634 in each branch set a Dirty Bit Read Pointer db0rdptr equal to the value of j0 found in cycle 1 step 1531 of FIG. 10. Operations 1641, 1642, 1643, 1644 in each branch determine if the dirty bit db is set to one (1). If so, the memory has valid data, and each branch proceeds to read memory Sj0 from address j0 which points to memory M0 in steps 1651 and 1652, and otherwise to memory M1 in steps 1653 and 1654. If dirty bit db is not set to zero, the address itself is used, and the value Sj0 is read from the address j0, as indicated by steps 1656, 1657, 1658, 1659.

In FIG. 11, further operations 1661, 1662, 1663, 1664 set at least one write pointer as appropriate to the setup tables entries. For example in Cases 1 and 4 where addresses j0 and j1 are equal to each other in LSB by pointing to the same memory (i.e., j0, j1=00 and 11), the write pointer db0wrptr is set to point to address j0 in the dirty bit array 1430 of FIG. 8. This pointer setting is made in each of steps 1661 and 1664 because in each case the value S0 is written to address j0 and no other write occurs in the same clock cycle 2 of the setup TABLEs for these two Cases 1 and 4. Then because of the write to memory, the respective succeeding steps 1671 and 1674 set the dirty bit register with address j0 in dirty bit array 1430.

Advantageously, in steps 1662 and 1664, not one but two write pointers db0wrptr and db1wrptr are suitably simultaneously set to point to respective addresses j0 and j1 in the dirty bit array 1430 of FIG. 8. These two pointer settings are made in each of steps 1662 and 1663 because in each setup Case 2 and 3 the value S0 is written to address j0 and the value S1 is written to address j1. Both of these writes (S0, S1) occur in the same clock cycle 2 of the setup TABLEs for these two Cases 2 and 3.

Returning to discussion of Cases 1 and 4, the second write pointer db1wrptr is set to point to address j1 in the dirty bit array 1430 of FIG. 8 in each of the FIG. 5 state 1130 READ_LOOKAHEAD_MEM0 and FIG. 5 state 1140 READ_LOOKAHEAD_MEM1. This pointer setting is made (not shown because outside of FIG. 11 state READ_SI_WR_SJ) because in each of Case 1 and Case 4 the value S1 is written to address j1 in clock cycle 3 and no other write occurs in the same clock cycle 3 of the setup TABLEs for these two Cases 1 and 4.

In FIG. 11, operations go from the respective case operation 1671, 1672, 1673, or 1674 to a branch 1680. If the shuffle iterations are not finished, analogous to the loop of FIG. 10, then operations increment the byte index in step 1685 and loop back to case branch 1620. Otherwise operations reach RETURN 1190.

Figure 12:
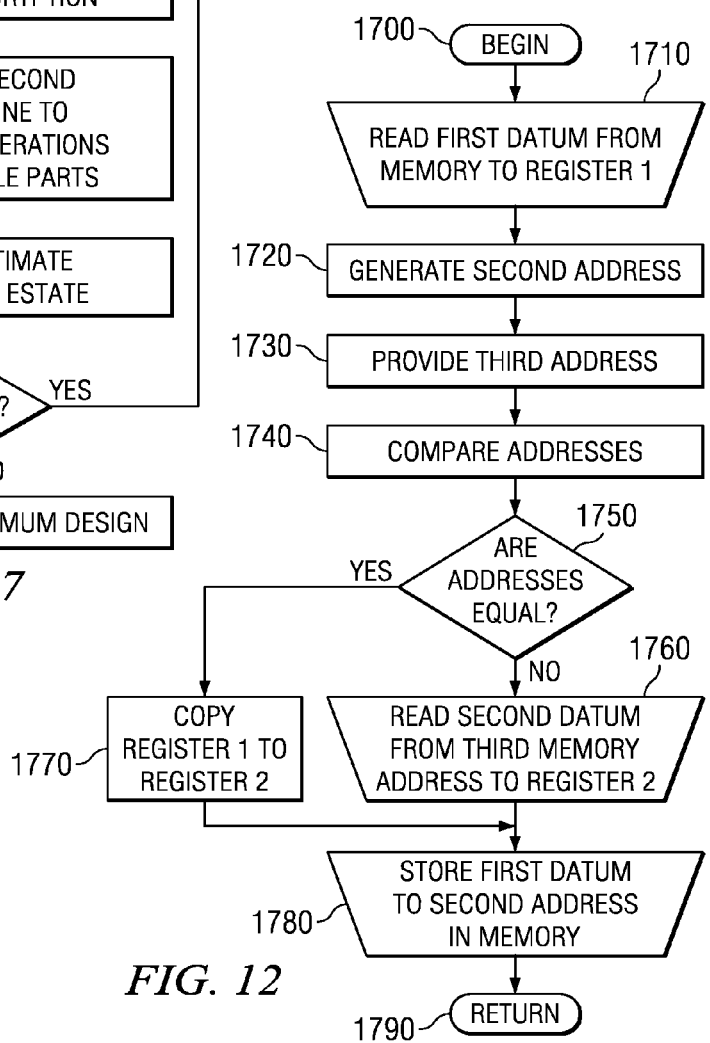
FIG. 12 is a flow diagram of an inventive process of dependency resolution.

In FIG. 12, a process of dependency resolution commences at a BEGIN 1700. Parentheses are used to identify data and addresses by way of another one example only (and different from the dependency example narrated for FIG. 9 to add further description). Step 1710 reads to a first register (one register in registers 1497) a first datum (Sj1) stored at a location in memory 1405 represented by a first address (j1). Next in a step 1720 a second address (i+1) is generated at which the first datum (Sj1) will be stored in the memory 1405.

A further step 1730 provides a third address (t1) at which a second datum (St1) can be read. A succeeding step 1740 compares the second address (i+1) with the third address (t1) and enters branch 1750. If the result of the comparison is different ("NO," addresses not equal, not same, no dependency issue) then operations go to a step 1760 reading the second datum (St1) to a second register (for St1 in registers 1497) from the third address (t1) in the memory 1405. If the result of the comparison is same ("YES," addresses equal, dependency exists), then operations instead go from branch 1750 to a step 1770. Step 1770 copies the first datum (Sj1) to the second register (for St1 in registers 1497) as the second datum (St1). After either step 1750 or 1770, operations proceed to a step 1780 storing the first datum (Sj1) at the second address (i+1) after the reading or storing of the second datum (St1) to the second register (for St1 in registers 1497).

Advantageously, this process of FIG. 12 is performed plural times concurrently on two bytes (e.g., St0 and St1) in the same iteration of overlapping dependent calculations, thus increasing the throughput of the process substantially. Multiple dependencies are suitably resolved in the same iteration by applying the solutions described herein to each of the dependencies.

Average Data Rate Computation: Two 2-Port Half-Memories, Double-Byte Throughput

The average encryption data rate is computed as the weighted average of the number of cycles per iteration weighted by the number of Case/SubCases to which that number pertains. The Rate Table below tabulates the cycles per iteration for each of the Case/SubCases. Due to symmetry in this embodiment, the Rate Table is symmetric around its main diagonal from upper left to lower right.

| RATE TABLE | | | | |
|---|---|---|---|---|
| Case | (a) | (b) | (c) | (d) |
| 1 | 5 | 4 | 4 | 4 |
| 2 | 4 | 3 | 3 | 4 |
| 3 | 4 | 3 | 3 | 4 |
| 4 | 4 | 4 | 4 | 5 |

For one illustrative example only, and in the embodiment above, assume that clock runs at a constant rate so that clock cycles are of equal duration and thus of equal probability EXPECTED THROUGHPUT =
[2$subcas$(5$cycl$/2Bytes) + 10$subcas$(4$cycl$/2Bytes) + 4$subcas$(3$cycl$/2Bytes)]/16$subcas$ = 1.94 cycles/Byte), or 1.03 Bytes every 2cycles The above calculation assumes that each of the sixteen Case/SubCases occurs with equal probability. Another way of calculating it is:
No of bytes processed in all the above combinations=2×16=32 bytes
Total no of clock cycles taken for this processing=31×2=62 cycles
Expected throughput=32/62=1.03 bytes per 2 clock cycles.
BEST CASE: A higher estimate assumes all encryption cases run in 3 cycles
(as in Cases 2(b), 2(c), 3(b) and 3(c)):
2 Bytes/3 cycles=1.33 Byte/2 cycles.
WORST CASE: A lower estimate assumes all encryption cases run in 5 cycles
(i.e. case 1(a) and case 4 (c)):
2 Bytes/5 cycles=0.80 Byte/2 cycles.
At a processor clock frequency of 40 MHz, the data rate in megabits per second (1 Byte=8 bits) for this two dual-port memory, 2-bytes embodiment is AVERAGE DATA RATE=1.03(Bytes/2 cycles)×8 bits/Byte×40 MHz=164.8 Mbps.

A high estimate for data rate is 1.33(Bytes/2 cycles)×8 bits/Byte×40 MHz=213.3 Mbps.
A low estimate for data rate is 0.80 Bytes/2 cycles)×8 bits/Byte×40 MHz=128 Mbps.

Remarkably, a group of the inventive embodiments using highly regular process tables produces at least 0.40 bytes/cycle minimum throughput using only 256 bytes in memory for S-Box, 256 dirty bits in the dirty bit array with single cycle initialization and less than 385 cycle S-Box setup all in less than 20,000 (twenty thousand) gates and in some cases less than 15,000 (fifteen thousand) gates.

In a real time system, every 1000 clock cycles are shared between encryption, decryption, and all other features of the application which that processor supports. Thus, the RATE calculation above may need to be diminished by a Factor representing the fraction of clock cycles which are devoted to encryption and decryption. If a general purpose processor has an associated processor sometimes called an accelerator, such as a digital signal processor (DSP) from Texas Instruments Incorporated, the associated processor may be able to devote a higher percentage of its clock cycles to encryption/decryption, thereby increasing that Factor. The application may be a cell phone, a wireless local area network (WLAN) client, a WLAN access point, or other equipment.

Four 2-Port Quarter-Memory, Quadruple-Byte Throughput Embodiment (64 bytes per two-port memory, 4 bytes/iteration) The four two port memory embodiment is believed to have 4-to-the-$8^{th}$-power or 64K encryption tables of Case/Subcase combinations.

Also, the number of encryption tables for all the Cases/SubCases is equal to the square of the following: Number of Memories (base) raised to the Number of Concurrently Processed Variables power (exponent).

Here the reasoning is that the last two bits of each address i byte are used to identify the memory being addressed by respective last-two-bits 00, 01, 10, 11. Thus the addresses $j_{i=0}$ and $j_{i=1}$ from the two-port memory cases above are replaced by four addresses j that can point to any of, not two memories, but four memories: $j_{i=00}$, $j_{i=01}$, $j_{i=10}$, $j_{i=11}$.

Thus, 256=4×4×4×4=$4^4$ (four-to-the-fourth-power) tables result for the S-Box shuffle operation and represent that many Cases. Furthermore, in encryption, four reads of key bytes are needed $t_{i=00}$, $t_{i=01}$, $t_{i=10}$, $t_{i=11}$. These addresses can point to any of the four memories. Thus, 4×4×4×4=$4^4$ (four-to-the-fourth-power) tables result for the key bytes reading operation in encryption, and represent that many Subcases for each Case. In all, the number of encryption tables for all the Cases/SubCases is the product of the number of Cases times the number of Subcases, or $4^4$ (four-to-the-fourth-power) times $4^4$ (four-to-the-fourth-power) which equals $4^8$ (four-to-the-eighth-power). This number of encryption tables is about 64,000. Implementation of the appropriate state machines is accomplished by the skilled worker using computer-based design tools. While this category of embodiments confers a setup time reduction improvement and encryption throughput increase improvement, it is believed that they will be at least somewhat more complex in the state machine implementation.

Terminology Followed:
First Row of each table: Represents the memory banks
All but the first row of each table: operations done in the memory banks. Each row corresponds to one clock cycle in ascending order from top to down. i.e. Second row indicates the operations done in the first clock cycle of the iteration and so on.
First Column of each table: Read from Memory bank $M_0$
Second Column of each table: Write to Memory bank $M_0$
Third Column of each table: Read from Memory bank $M_1$
Fourth Column of each table: Write to Memory bank $M_1$
Fifth Column of each table: Read from Memory bank $M_2$
Sixth Column of each table: Write to Memory bank $M_2$
Seventh Column of each table: Read from Memory bank $M_3$
Eighth Column of each table: Write to Memory bank $M_3$

TABLE

| | Case ( ) | | | | | | | |
|---|---|---|---|---|---|---|---|---|
| | R $M_0$ | W $M_0$ | R $M_1$ | W $M_1$ | R $M_2$ | W $M_2$ | R $M_3$ | W $M_3$ |
| 1 | $S_0$ | | $S_1$ | | $S_2$ | | $S_3$ | |
| 2 | | | | | | | | |
| 3 | | | | | | | | |
| 4 | | | | | | | | |
| 5 | | | | | | | | |
| 6 | | | | | | | | |

For the present embodiment having four 2-port memories each of sixty-four 64 bytes, the maximum number of simultaneous reads that a memory $M_0$ or memory $M_1$ permits is exactly one each, and the maximum number of simultaneous writes that a memory $M_0$ or memory $M_1$ permits is also exactly one each. In other four 2-port memory embodiments, constraints observed may vary.

Two 4-Port Half-Memory, Quadruple-Byte Throughput Embodiments

In general, the number of S-Box setup tables for all the Cases is equal to: the Number of Memories (base) raised to the Number of Concurrently Processed Variables power (exponent).

Also, the number of encryption tables for all the Cases/SubCases is equal to the square of the following: Number of Memories (base) raised to the Number of Concurrently Processed Variables power (exponent).

Advantageously, the two 4-port half-memory embodiments have a smaller number in the base than the four 2-port quarter-memory embodiments. Accordingly, they utilize a more manageable number of Tables in processing the same Number of Concurrently Processed Variables.

The two four-port memory group of embodiments are analyzed here processing four (4) bytes per iteration. They have 16 (sixteen) S-Box setup process tables, because the quantity two-to-the-fourth-power is sixteen (1) ($2^4=16$) and hence 16 tables are sufficient to describe them. The S-Box setup process tables have eight (8) columns RRWWRRWW because the two memories have two (2) read ports and two (2) write ports.

The two four-port memory group of embodiments processing four (4) bytes per iteration have 256 (two hundred fifty six) encryption process tables, because the square of the quantity two-to-the-fourth-power is 256 $((2^4)(2^4)=2^8=256)$ and hence 256 tables are used to describe them. The encryption process tables also have eight variables (8) columns RRWWRRWW because the two memories have two (2) read ports and two (2) write ports. Due to the number, the skilled worker suitably completes the memory access tables and prepares the state machines according to the principles already set forth using computerized tools.

The throughput analysis of this category of embodiments is described next. Then an example of some of the tables is provided to show the process.

Analysis for Two Four-Port Half-Memories (128 Bytes Each):

Accesses required: $S_{j0}$, $S_{j1}$, $S_{j2}$, $S_{j3}$, $S_{r0}$, $S_{r1}$, $S_{r2}$, $S_{r3}$ Each access can be from any memory bank i.e. $M_0$, $M_1$.

i.e. There are $2^8$ such possible combinations=256.

Sbox Setup Step:

Accesses required: $S_{j0}$, $S_{j1}$, $S_{j2}$, $S_{j3}$

Each access can be from any memory bank i.e. $M_0$, $M_1$.

i.e. There are $2^4$ such possible combinations=16.

Possible cycle latencies (per four bytes of processing):

2 cycles (6 combinations)

3 cycles (10 combinations

Since the total number of possible combinations is 256 the other case (4 cycles) have 190 possible values.

| Latency cycles | Number of possible cases |
|---|---|
| 2 | 6 |
| 3 | 10 |

| Latency cycles | Number of possible cases | Total Cycles (Col1 * Col2) |
|---|---|---|
| 2 | 6 | 12 |
| 3 | 10 | 30 |
| Total | 16 | 42 |

Hence average number of cycles per computation of 4 bytes of data: 42/16=2.625 cycles.

For Sbox setup the number of bytes need to process=256 bytes

Setup Figures are:

| Best case (cycles) | Worst case (cycles) | Average (cycles) |
|---|---|---|
| 128 | 192 | 42 * 4 = 168 |

Encryption Step:

Possible cycle latencies (per four bytes of processing):

3 cycles (6×6 possible combinations)

4 cycles 5 cycles (2 possible combinations)

Since the total number of possible combinations is 256 the other case (4 cycles) have 218 possible values.

| Latency cycles | Number of possible cases |
|---|---|
| 3 | 36 |
| 4 | 218 |
| 5 | 2 |

| Latency cycles | Number of possible cases | Total Cycles (Col1 * Col2) |
|---|---|---|
| 3 | 36 | 108 |
| 4 | 232 | 928 |
| 5 | 2 | 10 |
| Total | 256 | 1046 |

Hence average number of cycles per computation of 4 bytes of data: 1046/256=4.09 cycles.

Encryption Throughput Figures are:

| Best case (bytes/cycles) | Worst case (bytes/cycles) | Average (bytes/cycles) |
|---|---|---|
| 1.33 | 0.8 | 1.02 |

Terminology Followed:

First Row of each table: Represents the memory banks

All but the first row of each table: operations done in the memory banks. Each row corresponds to one clock cycle in ascending order from top to down. i.e. Second row indicates the operations done in the first clock cycle of the iteration and so on.

First Column of each table: Read from Memory bank $M_0$

Second Column of each table: Read from Memory bank $M_0$

Third Column of each table: Write to Memory bank $M_0$

Fourth Column of each table: Write to Memory bank $M_0$

Fifth Column of each table: Read from Memory bank $M_1$

Sixth Column of each table: Read from Memory bank $M_1$

Seventh Column of each table: Write to Memory bank $M_1$

Eighth Column of each table: Write to Memory bank $M_1$

|   | R $M_0$ | R $M_0$ | W $M_o$ | W $M_0$ | R $M_1$ | R $M_1$ | W $M_1$ | W $M_1$ |
|---|---|---|---|---|---|---|---|---|
| 1 | $S_0$ | $S_1$ |  |  | $S_2$ | $S_3$ |  |  |
| 2 |  |  |  |  |  |  |  |  |
| 3 |  |  |  |  |  |  |  |  |
| 4 |  |  |  |  |  |  |  |  |
| 5 |  |  |  |  |  |  |  |  |
| 6 |  |  |  |  |  |  |  |  |

For the present embodiment having two 4-port memories each of 128 bytes, the maximum number of simultaneous reads that a memory $M_0$ or memory $M_1$ permits is exactly two each, and the maximum number of writes that a memory $M_0$ or memory $M_1$ permits is also exactly two each. In other two 4-port memory embodiments, constraints observed may vary.

One 4-Port Full-Memory, Double-Byte Throughput Category of Embodiments

In general, as noted above, the number of S-Box setup tables for all the Cases is equal to: the Number of Memories (base) raised to the Number of Concurrently Processed Variables power (exponent).

Also, the number of encryption tables for all the Cases/SubCases is equal to the square of the following: Number of Memories (base) raised to the Number of Concurrently Processed Variables power (exponent).

Advantageously, the one-memory embodiments have a low number in the base. Accordingly, they utilize fewer tables in processing the same Number of Concurrently Processed Variables. The number of ports is applied to the full-size 256 byte memory as compared with embodiments with e.g., two memories and 128 bytes each with two ports.

The one four-port memory group of embodiments are analyzed here processing two (2) bytes per iteration. They have one S-Box setup process table, because the quantity one-to-the-second-power is one (1) ($1^2=1$) and hence one table is used to describe them. The S-Box setup process table has four (4) columns RRWW because the one memory has two (2) read ports and two (2) write ports.

The one four-port memory group of embodiments processing two (2) bytes per iteration have one encryption process table, because the square of the quantity one-to-the-second-power is one (1) (($1^2$) ($1^2$)=$1^4=1$) and hence once table is used to describe them. The encryption process table also has four (4) columns RRWW because the one memory has two (2) read ports and two (2) write ports.

Step 1) Setup

The four port asynchronous read and synchronous write RAM gives the facility to make two reads and writes simultaneously from and to the memory. Shown below is the figure that shows the memory accesses in various cycles of operation during the Sbox setup phase.

S-BOX SETUP PROCESS TABLE
Case (1)

|   | R $M_0$ | W $M_0$ | R $M_0$ | W $M_0$ |
|---|---|---|---|---|
| 1 | $S_0$ |  | $S_1$ |  |
| 2 | $S_{j0}$ | $S_0$ | $S_{j1}$ | $S_1$ |
| 3 | $S_2$ | $S_{j0}$ | $S_3$ | $S_{j1}$ |

Two bytes of setup are achieved in two cycles of operation. Complete setup (for 256 bytes) therefore takes 256 cycles of operation after cycle 1.

Step 2) Encryption Step $Si_0$>>Sbox memory access at location i=0—ith thread
$S_{j0}$>>Sbox memory access at location $j_{i=0}$—ith thread
$S_{t0}$>>Sbox memory access at location $t_{i=0}$—ith thread
$Si_1$>>Sbox memory access at location i=1—(i+1)th thread
$S_{j1}$>>Sbox memory access at location $j_{i=1}$—(i+1)th thread
$S_{t1}$>>Sbox memory access at location $t_{i=1}$—(i+1)th thread
$Si_2$>>Sbox memory access at location i=2—next iteration
$Si_3$>>Sbox memory access at location i=3—next iteration Since the four port memory provides the option of two reads and writes in a single cycle, therefore the Sjs can be read in the cycle after Sis reads and subsequently Sts can be read in the next cycle thereafter. Following table represents the read and write access to the four port memory in the course of encryption.

ENCRYPTION PROCESS TABLE
Case (1)

|   | R $M_0$ | W $M_0$ | R $M_0$ | W $M_0$ |
|---|---|---|---|---|
| 1 | $S_0$ |  | $S_1$ |  |
| 2 | $S_{j0}$ | $S_0$ | $S_{j1}$ | $S_1$ |
| 3 | $S_{t0}$ |  | $S_{t1}$ |  |
| 4 | $S_0$ | $S_{j0}$ | $S_1$ | $S_{j1}$ |

The Sj writes are arranged to take place in either cycle 3 or cycle 4 as selected by the skilled worker. Either way, the encryption iteration takes three cycles of operations per two bytes of data. Hence the throughput is ⅔ bytes per cycle. Advantageously, the encryption throughput is uniformly produced every three cycles per two bytes over time.

Analysis for One Four-Port Full Memory (256 Bytes) with Double-Byte Throughput:

Accesses required: $S_{j0}$, $S_{j1}$, $S_{t0}$, $S_{t1}$
Each access can be from the one memory i.e. $M_0$.
i.e. There are $1^4$ such possible combination=1.
Encryption Step 2 cycle latency (per two bytes of processing): Three (3) cycles, one case. Total cycles: 3.
Encryption throughput: 0.67 bytes/cycle in best, worst, and average case.

Sbox setup step accesses required: $S_{j0}$, $S_{j1}$
Each access can be from the one memory i.e. $M_0$, i.e. there is only one combination.
Possible cycle latencies (per four bytes of processing): 2 cycles, one case.
Total cycles: 2.
For Sbox setup the number of bytes need to process=256 bytes
Setup figures are: 256 cycles=64 (4-byte groups)×2 cycles/iteration in best, worst, and average case.

One 8-Port Memory Category of Embodiments

In general, as noted above, the number of S-Box setup tables for all the Cases is equal to: the Number of Memories (base) raised to the Number of Concurrently Processed Variables power (exponent).

Also, the number of encryption tables for all the Cases/SubCases is equal to the square of the following: Number of Memories (base) raised to the Number of Concurrently Processed Variables power (exponent).

Advantageously, the one-memory embodiments have a low number in the base. Accordingly, they utilize fewer tables in processing the same Number of Concurrently Processed Variables. The number of ports is applied to the full-size 256 byte memory as compared with embodiments with e.g., two memories and 128 bytes each with two ports.

The one eight-port memory group of embodiments are analyzed here processing four (4) bytes per iteration. They have one S-Box setup process table, because the quantity one-to-the-fourth-power is one (1) (1^4=1) and hence one table is used to describe them. The S-Box setup process table has eight (8) columns RRWW because the one memory has four (4) read ports and four (4) write ports.

The one eight-port memory group of embodiments processing four (4) bytes per iteration have one encryption process table, because the square of the quantity one-to-the-fourth-power is one (1) ((1^4)(1^4)=1^8=1) and hence once table is used to describe them. The encryption process table also has eight (8) columns RRRRWWWW because the one memory has four (4) read ports and four (4) write ports.

| S-BOX SETUP PROCESS TABLE Case (1) | | | | | | | |
|---|---|---|---|---|---|---|---|
| R $M_0$ | R $M_0$ | R $M_o$ | R $M_0$ | W $M_0$ | W $M_0$ | W $M_o$ | W $M_0$ |
| 1 $S_0$ | $S_1$ | $S_2$ | $S_3$ | | | | |
| 2 | | | | | | | |
| 3 | | | | | | | |
| 4 | | | | | | | |
| 5 | | | | | | | |
| 6 | | | | | | | |

| ENCRYPTION PROCESS TABLE Case (1) | | | | | | | |
|---|---|---|---|---|---|---|---|
| R $M_0$ | R $M_0$ | R $M_o$ | R $M_0$ | W $M_0$ | W $M_0$ | W $M_o$ | W $M_0$ |
| 1 $S_0$ | $S_1$ | $S_2$ | $S_3$ | | | | |
| 2 | | | | | | | |
| 3 | | | | | | | |
| 4 | | | | | | | |
| 5 | | | | | | | |
| 6 | | | | | | | |

The throughput analysis of this category of embodiments is described next. Then an example of some of the tables is provided to show the process.

Analysis for One Eight-Port Memory (256 Bytes):

Analysis is same as one 4-port memory case except that twice as many bytes per cycle are processed. This produces the following results.

Encryption accesses: $S_{j0}, S_{j1}, S_{j2}, S_{j3}, S_{t0}, S_{t1}, S_{t2}, S_{t3}$
Each access can be from the one memory i.e. $M_0$.
i.e. There are 1^8 such possible combination=1.
Encryption Step 2 cycle latency (per four bytes of processing): Three (3) cycles, one case. Total cycles: 3.
Encryption throughput: 1.33 bytes/cycle in best, worst, and average case.
Sbox setup step accesses required: $S_{j0}, S_{j1}, S_{j2}, S_{j3}$
Each access can be from the one memory i.e. $M_0$, i.e. there are 1^4 such possible combination=1, i.e. there is one combination.
Possible cycle latencies (per four bytes of processing): 2 cycles, one case.
Total cycles: 2.
For Sbox setup the number of bytes need to process=256 bytes
Setup figures are: 128 cycles=64 (4-byte groups)×2 cycles/iteration in best, worst, and average case.

A few preferred embodiments have been described in detail hereinabove. It is to be understood that the scope of the invention comprehends embodiments superficially different from those described yet within the inventive scope. Microprocessor and microcomputer are synonymous herein. Processing circuitry comprehends digital, analog and mixed signal (digital/analog) integrated circuits, ASIC circuits, PALs, PLAs, decoders, memories, non-software based processors, and other circuitry, and digital computers including microprocessors and microcomputers of any architecture, or combinations thereof. Internal and external couplings and connections can be ohmic, capacitive, direct or indirect via intervening circuits or otherwise as desirable. Implementation is contemplated in discrete components or fully integrated circuits in any materials family and combinations thereof. Various embodiments of the invention can employ hardware, software or firmware. Process diagrams herein are representative of flow diagrams for operations of any embodiments whether of hardware, software, or firmware, and processes of manufacture thereof.

While this invention has been described with reference to illustrative embodiments, this description is not to be construed in a limiting sense. Various modifications and combinations of the illustrative embodiments, as well as other embodiments of the invention may be made. It is therefore contemplated that the appended claims and their equivalents cover any such embodiments, modifications, and embodiments as fall within the true scope of the invention.

What is claimed is:

1. Circuitry for use with a storage having storage locations for data and dirty bits accessible at addresses corresponding to addresses in the storage, the circuitry comprising:
    an address line for carrying address bits;
    a data line for carrying data bits;
    a dirty bit line for conveying a dirty bit set/reset state;
    a selector circuit having a selector output selectively coupled to the address line, and to the data line, the selector circuit responsive to a state on the dirty bit line to couple data bits related to the address bits themselves from the address line to the selector output.

2. The circuitry claimed in claim 1 herein the selector circuit is further responsive to a different state on the dirty bit line to couple the data line to the selector output instead.

3. The circuitry claimed in claim 1 further comprising a read line coupled to said selector circuit, wherein the selector circuit is further responsive to a read signal on said read line and to a different state on the dirty bit line to couple the data line to the selector output.

4. The circuitry claimed in claim 1 further comprising a control line for carrying a write signal, and a dirty bit control circuit responsive to the write signal on said control line to put a set state on a dirty bit.

5. The circuitry claimed in claim 1 further comprising an address generator coupled to said address line.

6. The circuitry claimed in claim 5 further comprising a sequential control circuit having an output coupled to said address generator.

7. The circuitry claimed in claim 1 further comprising a sequential control circuit having at least one output coupled to enable data reads through said selector circuit.

8. The circuitry claimed in claim 1 further comprising a dirty bit reset line and a sequential control circuit having an output coupled to said dirty bit reset line.

9. The circuitry claimed in claim 1 further comprising a write line coupled to the storage and coupled to the dirty bits to set the dirty bit corresponding to each storage location written to, whereby each storage location not written to has its corresponding dirty bit still reset and each storage location written to has its corresponding dirty bit element set.

10. The integrated circuit of claim 1 further comprising a reset circuit coupled to said dirty bits and operable in a manner to reset said dirty bits, without initializing the at least some storage locations.

11. The circuitry claimed in claim 1 further comprising a reset circuit coupled to reset the dirty bits concurrently.

12. The circuitry claimed in claim 1 further comprising a reset circuit coupled to reset all the dirty bits in one clock cycle.

13. The circuitry claimed in claim 1 wherein the data bits related to the address bits themselves include at least some of the address bits themselves.

14. The circuitry claimed in claim 1 further comprising a read line coupled to said selector circuit, but the read line isolated from set/reset of the dirty bits, whereby a read leaves the dirty bits unchanged.

15. The circuitry claimed in claim 1 further comprising a control circuit coupled to the address line, and responsive to a cryptological key.

16. The circuitry claimed in claim 1 further comprising a sequential control circuit operable to produce a series of reads and writes of data constituting a data swap between addresses.

17. The circuitry claimed in claim 1 further comprising a cryptological logic circuit having a first input for a stream of bits and a second input coupled to the selector output, and an output for supplying a cryptologically altered stream of bits.

18. The circuitry claimed in claim 1 wherein the selector circuit is responsive to a dirty bit corresponding to the storage location addressed, to convey at least some of the address bits to the selector output as data bits when that dirty bit is in reset state.

19. The circuitry claimed in claim 1 further comprising control circuitry coupled to the selector output to generate second address bits as a function of at least the data bits from the selector output.

20. A method of operating circuitry for use with a storage having storage locations for data at a set of at least some addresses in the storage and for use with addressable dirty bits corresponding to the data, wherein each dirty bit has a dirty bit state being a set state or a reset state, wherein the method comprises asserting a first address to retrieve the dirty bit state at that first address; and in response to a reset state as the dirty bit state retrieved, delivering to an output first data related to the first address instead of storage data at the first address.

21. The method claimed in claim 20 further comprising delivering second data to the output instead of the first data, in response to a set state as the dirty bit state retrieved, wherein the second data is related to data at the first address in the storage instead of to the first address itself.

22. The method claimed in claim 21 wherein the first data is the first address and the second data is the storage data at the first address.

23. The method claimed in claim 20 further comprising asserting a read signal with the first address, and delivering the first data provided the read signal is asserted.

24. The method claimed in claim 20 further comprising
asserting a second address to retrieve the dirty bit state at that second address; and in response to a set state as the dirty bit state retrieved from that second address, delivering second data to the output as a function of the data in the storage location at the second address.

25. The method claimed in claim 20 further comprising asserting a second address to store write data to the storage at the second address; and storing a set state in a dirty bit corresponding to the second address.

26. The method claimed in claim 20 further comprising asserting a write signal with a second address to store write data to the storage at the second address; and storing a set state in a dirty bit corresponding to the second address when the write signal is asserted.

27. The method claimed in claim 20 further comprising operating a sequential control circuit to sequentially perform a series of the asserting and delivering operations.

28. The method claimed in claim 20 further comprising reading and writing data to execute a data swap between addresses.

29. The method claimed in claim 20 further comprising initializing by resetting at least some of the dirty bits concurrently.

30. The method claimed in claim 20 further comprising initializing by resetting at least some of the dirty bits concurrently, instead of writing any initialization data to the storage.

31. The method of claim 20 further comprising initializing by resetting the set of dirty bits in response to one reset signal.

32. The method of claim 20 further comprising reading from a storage location and, upon such reading, leaving the state of the corresponding dirty bit unchanged.

33. The method of claim 20 further comprising generating a second address as a function of at least the first data thus delivered.

34. The method of claim 33 wherein the generating of the second address is further as a function of cryptological key bits.

35. The method of claim 33 further comprising asserting a read to the storage with the second address whereby second data are returned.

36. The method of claim 33 further comprising swapping data between the storage locations having the first address and the second address.

37. The method claimed in claim 20 wherein asserting the first address includes generating the first address as a function of a cryptological key.

38. The method claimed in claim 20 further comprising executing on a stream of bits a cryptological logic function in response to said output delivered as above, whereby a cryptologically altered stream of bits is supplied.

39. A digital circuit comprising a memory;

a dirty bit array; and an execution unit establishing maximum 256 (two hundred fifty six) bytes of an encryption S-Box in the memory and maximum 256 (two hundred fifty six) dirty bits in the dirty bit array corresponding to the encryption S-Box, the execution unit having throughput exceeding 0.40 Bytes per cycle, wherein each byte in the encryption S-box is operable to be swapped with any other byte in the encryption S-box and wherein a byte selected from the encryption S-box provides an encryption key;

the memory, dirty bit array, and execution unit together implemented in less than 20,000 (twenty thousand) gates.

40. A digital circuit comprising
a memory;
a dirty bit array; and
an execution unit establishing maximum 256 (two hundred fifty six) bytes of S-Box in the memory and maximum 256 (two hundred fifty six) dirty bits in the dirty bit array corresponding to the S-Box, the execution unit having throughput exceeding 0.40 Bytes per cycle;
a selector circuit having an output and for selecting, as a value for the output, between a value in an addressed S-box byte of the memory or the address of the addressed S-box in the memory, the selecting in response to a dirty bit corresponding to the addressed S-box byte; and
the memory, dirty bit array, and execution unit together implemented in less than 20,000 (twenty thousand) gates.

* * * * *